(12) United States Patent
Takase et al.

(10) Patent No.: US 10,494,016 B2
(45) Date of Patent: Dec. 3, 2019

(54) ELECTRIC POWER STEERING APPARATUS

(71) Applicant: NSK LTD., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Shinagawa-ku, Tokyo (JP)

(*) Notice: Subject to any disclaimer, the term of this patent is extended or adjusted under 35 U.S.C. 154(b) by 0 days.

(21) Appl. No.: 16/311,469

(22) PCT Filed: Jul. 20, 2017

(86) PCT No.: PCT/JP2017/026204
§ 371 (c)(1),
(2) Date: Dec. 19, 2018

(87) PCT Pub. No.: WO2018/016560
PCT Pub. Date: Jan. 25, 2018

(65) Prior Publication Data
US 2019/0329817 A1    Oct. 31, 2019

(30) Foreign Application Priority Data

Jul. 20, 2016 (JP) .............................. 2016-142625
Aug. 4, 2016 (JP) .............................. 2016-153712
(Continued)

(51) Int. Cl.
*B62D 5/04* (2006.01)
*H02M 1/38* (2007.01)
(Continued)

(52) U.S. Cl.
CPC ............ *B62D 5/0463* (2013.01); *H02M 1/38* (2013.01); *H02M 7/5395* (2013.01);
(Continued)

(58) Field of Classification Search
None
See application file for complete search history.

(56) References Cited

U.S. PATENT DOCUMENTS

| | | | |
|---|---|---|---|
| 5,872,710 A | 2/1999 | Kameyama | |
| 2015/0075898 A1* | 3/2015 | Suzuki | B62D 5/0472 363/132 |
| 2015/0077025 A1* | 3/2015 | Suzuki | B62D 5/0463 318/400.02 |

FOREIGN PATENT DOCUMENTS

| | | |
|---|---|---|
| JP | 10-164850 A | 6/1998 |
| JP | 2005-229717 A | 8/2005 |

(Continued)

OTHER PUBLICATIONS

International Search Report for PCT/JP2017/026204 dated Oct. 24, 2017 [PCT/ISA/210].
(Continued)

Primary Examiner — Richard M Camby
(74) Attorney, Agent, or Firm — Sughrue Mion, PLLC

(57) ABSTRACT

An electric power steering apparatus that ideally compensates dead time of the inverter without the tuning operation, improves distortion of the current waveform and the responsibility of the current control, and suppresses sound, vibration, the ripple that the low speed steering maneuver is effective. The apparatus converts dq-axes current command values calculated based on at least a steering torque into 3-phase duty command values, controls a 3-phase brushless motor by an inverter of a PWM-control, and applies an assist torque to a steering system of a vehicle, wherein 3-phase detection voltages are estimated based on 3-phase motor terminal voltages, loss voltages due to a dead time of the inverter are estimated from differences between 3-phase correction command voltages calculated from the 3-phase duty command values and the 3-phase detection voltages, (Continued)

and a dead time compensation of the inverter is performed by feeding back dead time compensation values obtained by compensating the loss voltages to the dq-axes current command values.

18 Claims, 30 Drawing Sheets

(30) Foreign Application Priority Data

| Sep. 6, 2016 | (JP) | 2016-173627 |
| Sep. 29, 2016 | (JP) | 2016-191027 |
| Dec. 28, 2016 | (JP) | 2016-256273 |
| Dec. 28, 2016 | (JP) | 2016-256274 |

(51) Int. Cl.
*H02P 21/06* (2016.01)
*H02P 21/13* (2006.01)
*H02P 27/08* (2006.01)
*H02M 7/5387* (2007.01)
*H02P 21/05* (2006.01)
*H02P 21/26* (2016.01)
*H02M 7/5395* (2006.01)

(52) U.S. Cl.
CPC ........ *H02M 7/53875* (2013.01); *H02P 21/05* (2013.01); *H02P 21/06* (2013.01); *H02P 21/13* (2013.01); *H02P 21/26* (2016.02); *H02P 27/08* (2013.01); *H02M 2001/385* (2013.01); *H02M 2007/53876* (2013.01)

(56) References Cited

FOREIGN PATENT DOCUMENTS

| JP | 2010-068662 A | 3/2010 |
| JP | 4681453 B2 | 5/2011 |
| JP | 2015-171251 A | 9/2015 |

OTHER PUBLICATIONS

Written Opinion for PCT/JP2017/026204 dated Oct. 24, 2017 [PCT/ISA/237].

* cited by examiner

PRIOR ART

PRIOR ART

PRIOR ART

FIG.25 FOURTH EMBODIMENT

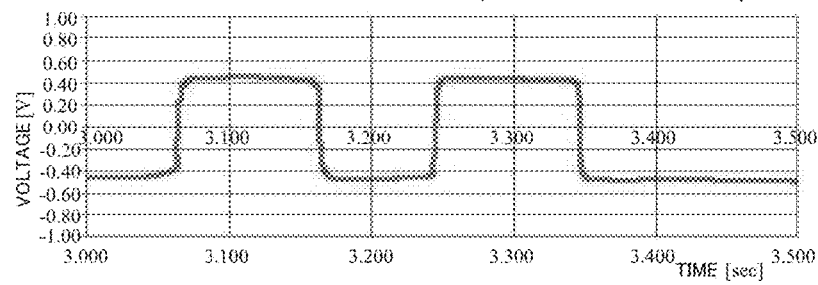
FIG.31A U-PHASE LOSS VOLTAGE WAVEFORM (DETECTION VALUE)
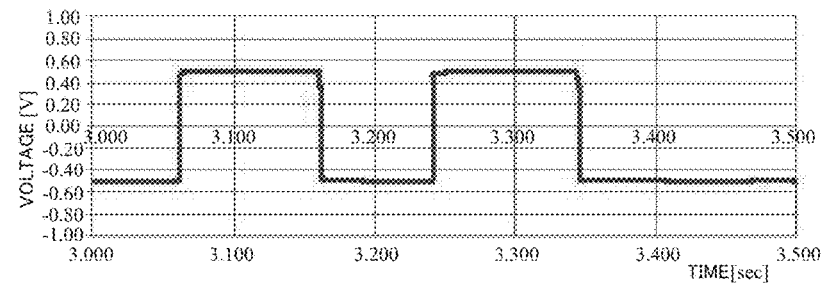
FIG.31B U-PHASE IDEAL DEAD TIME COMPENSATION WAVEFORM
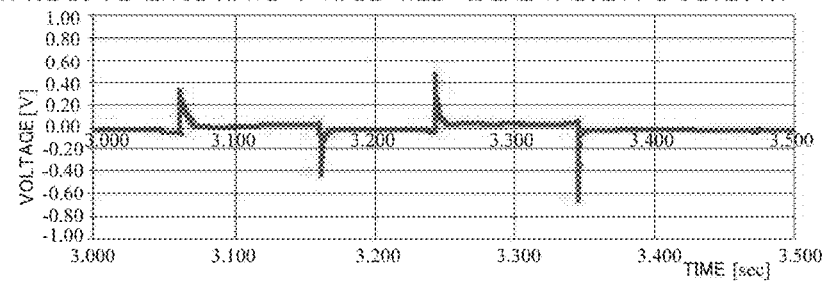
FIG.31C U-PHASE DIFFERENCE WAVEFORM BETWEEN IDEAL VALUE AND DETECTION VALUE
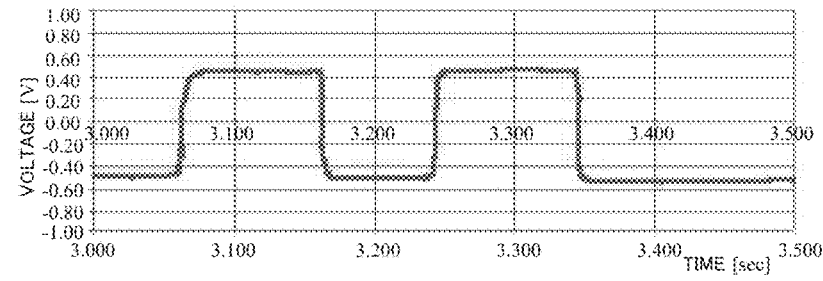
FIG.31D U-PHASE LOSS VOLTAGE WAVEFORM AFTER CORRECTION

FIG.34 FIFTH EMBODIMENT d-AXIS ANGLE-DEAD TIME COMPENSATION VALUE REFERENCE TABLE
(ELECTRIC ANGLE 0-359 [deg])

q-AXIS ANGLE-DEAD TIME COMPENSATION VALUE REFERENCE TABLE
(ELECTRIC ANGLE 0-359 [deg])

ELECTRIC POWER STEERING APPARATUS

CROSS REFERENCE TO RELATED APPLICATIONS

This application is a National Stage of International Application No. PCT/JP2017/026204 filed Jul. 20, 2017, claiming priority based on Japanese Patent Application Nos. 2016-142625 filed Jul. 20, 2016; 2016-153712 filed Aug. 4, 2016; 2016-173627 filed Sep. 6, 2016; 2016-191027 filed Sep. 29, 2017; 2016-256273 filed Dec. 28, 2016 and 2016-256274 filed Dec. 28, 2016.

TECHNICAL FIELD

The present invention relates to an electric power steering apparatus that vector-controls a driving of a 3-phase brushless motor with a dq-axes rotational coordinate system, compensates a dead time of an inverter based on motor terminal voltages, and enable to effectively assist-control in a low load and a low speed steering state, with a smooth maneuver and a steering sound.

BACKGROUND ART

An electric power steering apparatus (EPS) which provides a steering system of a vehicle with a steering assist torque (an assist torque) by a rotational torque of a motor, applies the steering assist torque to a steering shaft or a rack shaft by means of a transmission mechanism such as gears by using a driving force of the motor which is controlled by electric power supplied from an electric power supplying section. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor 20 for the EPS by means of a voltage control command value Vref obtained by performing a compensation or the like to the current command value.

As well, the steering angle (a motor rotational angle) θ is detected from the steering angle sensor 14, and it is possible to obtain the steering angle from a rotational sensor such as a resolver which is connected to the motor 20.

A controller area network (CAN) 40 to send/receive various information and signals on the vehicle is connected to the control unit 100, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. As shown in FIG. 2, the steering torque Th detected by the torque sensor 10 and the vehicle speed Vs detected by the vehicle speed sensor 12 are inputted into a current command value calculating section 31 which calculates the current command value Iref1. The current command value calculating section 31 calculates the current command value Iref1, based on the steering torque Th and the vehicle speed Vs with reference to an assist map or the like, which is a control target value of a current supplied to the motor 20. The calculated current command value Iref1 is added with a compensation signal CM for improving characteristics from a compensating section 34 at an adding section 32A. The current command value Iref2 after addition is limited the maximum value thereof at a current limiting section 33. The current command value Irefm whose maximum current is limited is inputted into a subtracting section 32B.

A deviation ΔI (=Irefm−Im) which is a subtraction result in the subtracting section 32B is current-controlled with a proportional-integral (PI) and so on in a PI-control section 35, the current-controlled voltage control command value Vref is inputted into a PWM-control section 36 with a modulation signal (a triangular wave carrier) CF. Duty command values are calculated in the PI-control section 35, and the motor 20 is PWM-controlled by using a PWM signal being calculated duty command values via an inverter 37. The current value Im of the motor 20 is detected by a motor current detector 38 and is fed-back to the subtracting section 32B.

The compensating section 38 adds a detected or estimated self-aligning torque (SAT) 343 with an inertia compensation value 342 in an adding section 344, further adds a convergency control value 341 with the added value in an adding section 345, and performs a characteristic improvement by inputting the added result to the adding section 32A as the compensation signal.

Recently, a 3-phase brushless motor is mainly used as an actuator of the electric power steering apparatus, and since the electric power steering apparatus is automotive products, the operating temperature range is wide. From a view point of a fail-safe, a dead time of the inverter to drive the motor needs greater than that for general industrial purposes that home appliances (industrial equipment<EPS). Generally, since a switching device (e.g. afield-effect transistor (FET)) has a delay time when it is turned OFF, a direct current link is shorted when the switching devices of an upper-arm and a lower-arm are simultaneously turned ON or OFF. In order to prevent the above problem, a time (a dead time) that the switching devices of both arms are turned OFF, is set.

As a result, a current waveform is distorted, and a responsibility of the current control and a steering feeling go down. For example, in a state that the handle is near on-center of the steering, a discontinuous steering feeling and the like due to the torque ripple are occurred. Further, since a motor back-EMF (electromotive force) at a time of awhile speed steering or a high speed steering and an interference voltage among windings act for the current control as a disturbance, a steering follow-up performance and a steering feeling at a turning back maneuver go down.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. A d-axis current command value id* and a q-axis current command value iq*, which are calculated in the current command value calculating section (not shown) based on the steering torque Th, the vehicle speed Vs and so on, of a dq-axes coordinate system of two axes are respectively inputted into subtracting sections 131$d$ and 131$q$, and current deviations Δid* and Δiq* obtained in the subtracting sections 131$d$ and 131$q$ are respectively inputted into PI-control sections 120$d$ and 120$q$. Voltage command values vd and vq PI-controlled in the PI-control sections 120$d$ and 120$q$ are respectively inputted into a subtracting section 141$d$ and an adding section 141$q$, and command voltages Δvd and Δvq obtained in the subtracting section 141$d$ and the adding section 141$q$ are inputted into a dq-axes/3-phase alternative current (AC) converting section 150. Voltage command values Vu*, Vv*, Vw* converted into 3-phases in the dq-axes/3-phase AC converting section 150 are inputted into a PWM-control section 160, and the motor 100 is driven with PWM-signals $U_{PWM}$, $V_{PWM}$, $W_{PWM}$ based on calculated 3-phase duty command values (duty$_u$, duty$_v$, duty$_w$) via the inverter (inverter applying voltage VR) 161 comprised of a bridge constitution of an upper-arm and a lower-arm as shown in FIG. 4. The upper-arm comprises of FETs Q1, Q3, Q5 serving as switching devices and the lower-arm comprises of FETs Q2, Q4, Q6.

The 3-phase motor currents iu, id, iw of the motor 100 are detected by current detectors 162, and the detected 3-phase motor currents iu, id, iw are inputted into a 3-phase AC/dq-axes converting section 130. Feedback currents id and iq of 2-phases converted in the 3-phase AC/dq-axes converting section 130 are respectively inputted into subtracting sections 131$d$ and 131$q$, and further inputted into a d-q non-interference control section 140. Voltage vd1* and vq1* of 2-phases from the d-q non-interference control section 140 are respectively inputted into the subtracting section 141$d$ and the adding section 141$q$, and the command voltages Δvd and Δvq are calculated in the subtracting section 141$d$ and the adding section 141$q$. The command voltages Δvd and Δvq are inputted into the dq-axes/3-phase AC converting section 150, and the motor 100 is driven via the PWM-control section 160 and the inverter 161.

Further, a rotational sensor such as a resolver is attached to the motor 100, and a motor rotational angle θ and a motor rotational number (a rotational velocity) ω are outputted from an angle detecting section 110 to process the sensor signal. The motor rotational angle θ is inputted into the 3-phase AC/dq-axes converting section 130, and the motor rotational number ω is inputted into the d-q non-interference control section 140.

The electric power steering apparatus of the vector control system described above is an apparatus to assist a steering of a driver, and a sound and a vibration of the motor, a torque ripple and the like are transmitted to the driver as a force sense via the steering wheel. The FETs are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned ON and OFF, the FET does not simultaneously turn ON and OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn ON and the upper-arm and the lower-arm become short circuits. There is a difference between the turn-ON time and the turn-OFF time of the FET. Thus, when the command is inputted into the FETs at the same time, the FET immediately turns ON in a case that the turn-ON time is short (for example, 100 [ns]) by inputting the ON-command to the upper-FET, and reversely, the FET does not immediately turns OFF in a case that the turn-OFF time is long (for example, 400 [ns]) by inputting the OFF-command to the lower-FET. In this way, a state (for example, between 400 [ ns]-100 [ ns], ON-ON) that the upper-FET is ON and the lower FET is ON, often momentarily occurs.

In this connection, in order not to occur that the upper-arm FET and the lower-arm FET do not simultaneously turn ON, the ON-signal is usually given to the gate driving circuit with a predetermined period being a dead time. Since the dead time is nonlinear, the current waveform is distorted, the responsibility of the control goes down and the sound, the vibration and the torque ripple are generated. In a column type electric power steering apparatus, since an arrangement of the motor directly connected to a gear box which is connected by the steering wheel and the column shaft made of steel is extremely near the driver in the mechanism, it is necessary to especially consider the sound, the vibration, the torque ripple due to the motor in comparison with a downstream type electric power steering apparatus.

Conventionally, as a method to compensate the dead time of the inverter, there are methods to add the compensation value by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Published Unexamined Patent Application No. 2015-171251 A (Patent Document 2). In Patent Document 1, there is provided a dead band compensating circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Published Unexamined Patent Application No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensating circuit is a changing value in proportion to the model current in a region being a predetermined fixed value or less, and is an addition value of the changing values in proportion to the fixed value and the model current in a region being more than the predetermined fixed value. In this way, the output value of the compensating circuit is outputted from the current command to the voltage command. However, the tuning working for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

In the feed forward type dead time compensation (an angle feed forward type, a current command value model type), since the current flows in the motor with an exclusive software by locking the motor output shaft, the necessary dead time compensation amount is needed to measure by using the actual machine. It is needed the tuning operation of the threshold value for determining the compensation sign due to the phase adjustment and the current command value by rotating a single motor under a constant load and a constant rotation speed by using a motor test apparatus. It is necessary to allot the inverter applying voltage and the motor rotational number and to perform plural times, and therefore the mitigation of the tuning operation is required.

Further, in the feed forward type dead time compensation, the chattering occurs near zero-cross time or at the low load and the low speed steering maneuver in a case that the sign is not switched with an appropriate compensation amount and on an appropriate timing. By inputting the dead time compensation that the compensation amount is unsuitable or the dead time compensation that the timing is unsuitable, there is a case that the chattering is often caused by the control itself. In the feed forward type dead time compensation, in order to suppress the above chattering, a quite accurate tuning operation such as various ideas and the strict switching of the compensation sign is needed.

The present invention has been developed in view of the above-described circumstances, and an object of the present invention is to provide the electric power steering apparatus that ideally compensates the dead time of the inverter without the tuning operation, improves the distortion of the current waveform and the responsibility of the current control, and suppresses the sound, the vibration, the ripple that the low speed steering maneuver is effective.

Means for Solving the Problems

The present invention relates to the electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle, the above-described object of the present invention is achieved by that: wherein 3-phase detection voltages are estimated based on 3-phase motor terminal voltages, loss voltages due to a dead time of the inverter are estimated from differences between 3-phase correction command voltages calculated from the 3-phase duty command values and the 3-phase detection voltages, and a dead time compensation of the inverter is performed by feeding back dead time compensation values obtained by compensating the loss voltages to the dq-axes current command values;
or comprising: a midpoint voltage estimating section that estimates midpoint voltages based on 3-phase motor terminal voltages, a motor rotational angle, a motor rotational number and an inverter applying voltage; a 3-phase detection voltage calculating section that calculates 3-phase detection voltages from the midpoint voltages and the 3-phase motor terminal voltages; a 3-phase command voltage calculating section that calculates 3-phase command voltages based on the 3-phase duty command values and the inverter applying voltage; a 3-phase loss voltage calculating section that estimates 3-phase loss voltages due to a dead time of the inverter from differences between the 3-phase detection voltages and the 3-phase command voltages; and a dead time compensation output section that calculates dq-axes dead time compensation values from the 3-phase loss voltages calculated in the 3-phase loss voltage calculating section with a sensitivity to the inverter applying voltage and in synchronous with the motor rotational angle; wherein a dead time compensation of the inverter is performed by feeding back the dq-axes dead time compensation values to the dq-axes current command values.

Further, the above-described object of the present invention is achieved by that: comprising: a first 3-phase alternative current (AC)/dq-axes converting section that converts detected 3-phase motor terminal voltages into dq-axes detection voltages in synchronous with a motor rotational angle and a motor rotational number; a 3-phase command voltage calculating section that calculates 3-phase command voltages based on the 3-phase duty command values and the inverter applying voltage; a second 3-phase AC/dq-axes converting section that converts the 3-phase command voltages into dq-axes command voltages; a loss voltage calculating section that calculates dq-axes loss voltages due to a dead time of the inverter from differences between the dq-axes detection voltages and the dq-axes command voltages; and a dead time compensation output section that calculates dq-axes dead time compensation values of which maximum value is limited by multiplying the dq-axes loss voltages with a predetermined gain and sensing to the inverter applying voltage; wherein a dead time compensation of the inverter is performed by feeding back the dq-axes dead time compensation values to the dq-axes voltage command values; or comprising: a 3-phase alternative current (AC)/dq-axes converting section that converts detected 3-phase motor terminal voltages into dq-axes detection voltages in synchronous with a motor rotational angle; a voltage ratio correction calculating section that calculates dq-axes command voltages from a ratio of the dq-axes voltage command values; a loss voltage calculating section that calculates dq-axes loss voltages due to a dead time of the inverter from differences between the dq-axes detection voltages and the dq-axes command voltages; and a dead time compensation output section that calculates dq-axes dead time compensation values of which maximum value is limited by multiplying the dq-axes loss voltages with a predetermined gain and sensing to the inverter applying voltage; wherein a dead time compensation of the inverter is performed by feeding back the dq-axes dead time compensation values to the dq-axes voltage command values.

Furthermore, the present invention relates to the electric power steering apparatus of a vector control system that converts dq-axes current command values calculated from steering assist command value calculated based on at least a steering torque into 3-phase duty command values, driving-controls a 3-phase brushless motor by an inverter of a pulse width modulation (PWM) control, and applies an assist torque to a steering system of a vehicle, the above-described object of the present invention is achieved by that having: a first function that estimates 3-phase detection voltages based on 3-phase motor terminal voltages, estimates 3-phase loss voltages due to a dead time of the inverter from differences between 3-phase command voltages calculated from the 3-phase duty command values and the 3-phase detection voltages, and performs a dead time compensation of the inverter by feeding back dead time compensation values obtained by compensating the 3-phase loss voltages to the dq-axes current command values; and a second function that calculates dead time compensation amount of the dead time based on a motor rotational angle, an inverter applying voltage, the 3-phase loss voltages and the steering assist current command values, and corrects the 3-phase loss voltages with the dead time compensation amount;

or comprising: a midpoint voltage estimating section that estimates midpoint voltages based on 3-phase motor terminal voltages, a motor rotational angle, a motor rotational number and an inverter applying voltage; a 3-phase detection voltage calculating section that calculates 3-phase detection voltages from the midpoint voltages and the 3-phase motor terminal voltages; a 3-phase command voltage calculating section that calculates 3-phase command voltages based on the 3-phase duty command values and the inverter applying voltage; a 3-phase loss voltage calculating section that estimates first 3-phase loss voltages due to a dead time of the inverter from differences between the 3-phase detection voltages and the 3-phase command voltages; a compensation amount improving section that calculates dead time compensation amount based on a motor rotational angle, the first 3-phase loss voltages, the steering assist command values and the inverter applying voltage; a calculating section that calculates second 3-phase loss voltages by correcting the first 3-phase loss voltages with the dead time compensation amount; and a dead time compensation output section that calculates dq-axes dead time compensation values from the second 3-phase loss voltages with a sensitivity to the inverter applying voltage and in synchronous with the motor rotational angle, and feeds back the dq-axes dead time compensation values to the dq-axes current command value.

Effects of the Invention

The electric power steering apparatus according to the present invention estimates the 3-phase voltages from the 3-phase motor terminal voltages, calculates the 3-phase applying voltages from the 3-phase duty command values and the inverter applying voltage, obtains the differences between the 3-phase command voltages and the 3-phase applying voltages, and then calculates the loss voltages lost due to the dead time. The calculated loss voltages are worked as the compensation amount, the electric power steering apparatus processes to limit the compensation amount in a case that a transitional difference voltage occurs due to the midpoint correction of the compensation amount, the motor back-EMF, noises and the like, and compensates the dead time by feeding back the limited compensation amount to the voltage command values on the dq-axes as the dead time compensation values. Since the dead time compensation of the terminal voltage feedback type calculates measurable compensation amount and an appropriate compensation sign by the calculation, the tuning operation is no almost needed. Further, it is possible to compensate in a nearly ideal compensation in the low speed steering region, and it is possible to improve the distortion of the current waveform and the responsibility of the current control.

FIG. 24 applied the dead time compensation shows the current waveform that the distortion is small in comparison with the current waveform of FIG. 23 without the dead time compensation. Since the motor can smoothly rotate in the case of FIG. 24, it is possible to suppress the sound, the vibration, the torque ripple. Since the loss voltages are converted into the dq-axes and the converted values are fed back as the compensation values, it is possible to compensate the dead time even on the dq-axes.

Further, since the compensation sign and the compensation amount are automatically calculated, the chattering does not occur even the low load the low speed steering region near the on-center of the steering wheel, and it is possible to compensate the dead time. Since the automatic calculation is performed even that the 3-phase compensation waveforms are rectangular wave, it is also possible to compensate the dead time.

Since the motor terminal voltage feed back type according to the present invention can enter the nearly ideal compensation and the optimum compensation sign by the calculation almost without the tuning operation, the contrivances to suppress the occurrence of the chattering are few in comparison with the feed forward type. However, it is possible to effectively enter the dead time compensation by suppressing the risk (the chattering occurred by the control itself) near the zero-cross region and the low load and the low speed steering region.

As well, in the dead time compensation of the terminal voltage feed back type, "92[%] to 95[%]" of the compensation amount measured by using the exclusive software from the difference between the estimated applying voltage and the detected voltage in the zero-cross region and the low load and the low speed steering region near the on-center, is calculated. Further, also about the compensation sign, the appropriate direction is calculated from the difference between the voltages. In the feed forward type, it is necessary to previously measure with the exclusive software and to perform the tuning by the motor test apparatus. On the contrary, in the feed back type, the measurable compensation amount and the compensation sign are obtained by the calculation without the rewrite for the test software and the tuning with the test apparatus.

BRIEF DESCRIPTION OF THE DRAWINGS

In the accompanying drawings:

FIGS. 31A to 31D are waveform charts showing an effect (U-phase) of the compensation amount improving section;

MODE FOR CARRYING OUT THE INVENTION

In order to resolve a problem that a current distortion and a torque ripple occur due to an influence of a dead time of an inverter in a control unit (ECU) and a steering sound goes down, the present invention estimates 3-phase voltages from 3-phase motor terminal voltages, calculates 3-phase command voltages from 3-phase duty command values and an inverter applying voltage, and calculates loss voltages lost due to the dead time by obtaining differences via delay model. The calculated 3-phase loss voltages are appropriately processed as compensation amount, and the processed compensation amount is fed back to voltage command values on dq-axes as dead time compensation values. Further, when needed, the present invention generates the dead time compensation amount to improve the calculated dq-axes loss voltages based on a motor rotational angle, a q-axis steering assist command value and the inverter applying voltage, improves the compensation amount by correcting the dq-axes loss voltages with the above dead time compensation amount, and compensates the dead time of the inverter by using the improved compensation values.

Furthermore, the present invention forms ideal dead time compensation values in a functional section, and corrects by gain-multiplying the deviations between the dead time compensation values before the correction. In this case, it is possible to compensate the dead time without a delay and to improve distortion of a current waveform and a responsibility of a current control.

The present invention judges a disturbance such as a motor back-EMF in a case that the compensation value exceeding the upper limit is detected from the detected loss voltages, and calculates losses due to the dead time by limiting the compensation values. Further, it is possible to perform the dead time compensation even on the dq-axes by converting the calculated loss voltages into the dq-axes and feeding back as as the dead time compensation values.

Embodiments according to the present invention will be described in detail with reference to the drawings.

Figure 3:
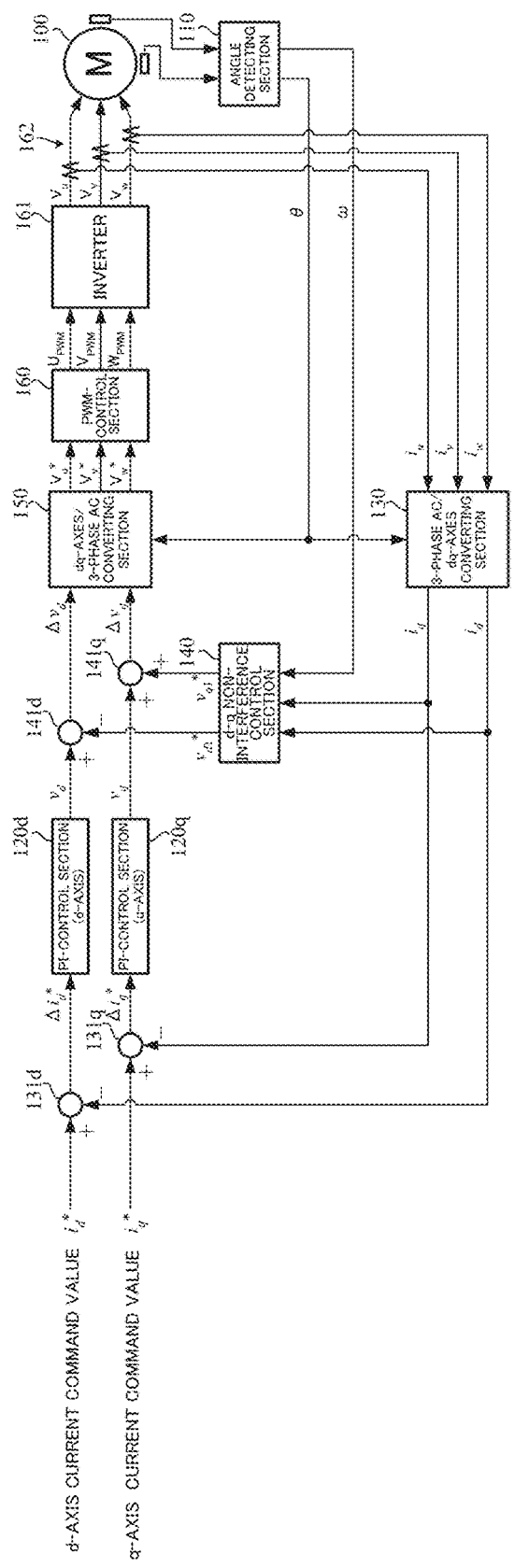
FIG. 3 is a block diagram showing a configuration example of a vector control system.
Figure 4:
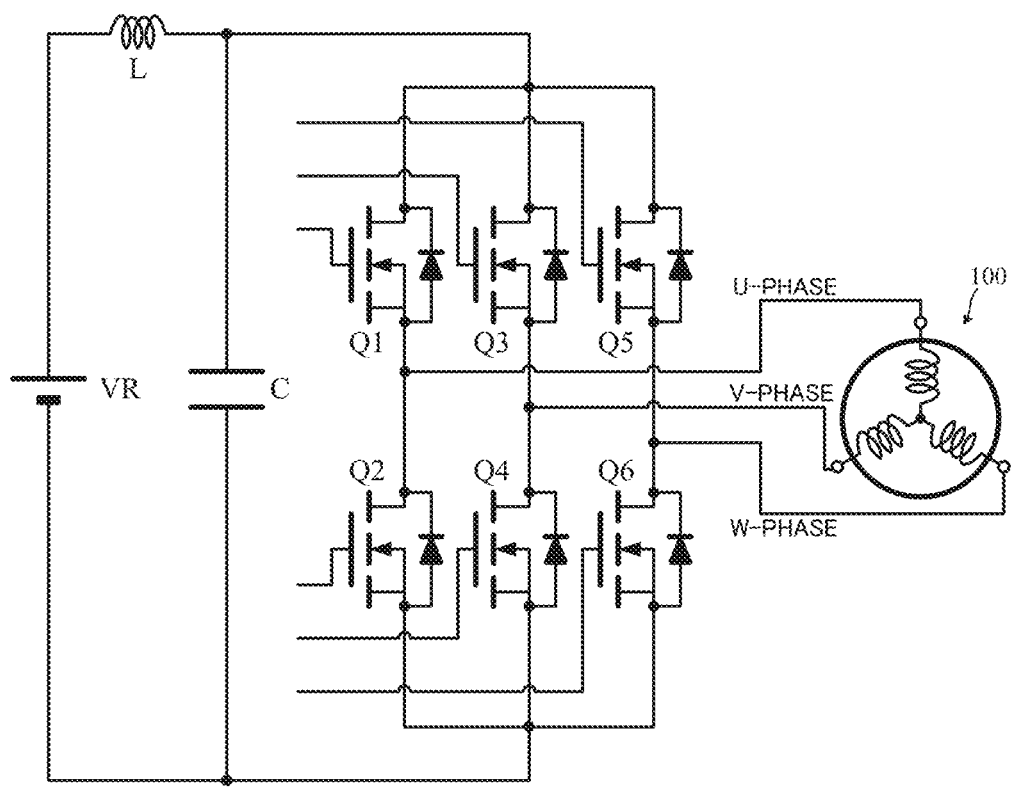
FIG. 4 is a wiring diagram showing a configuration example of a general inverter.
Figure 5:
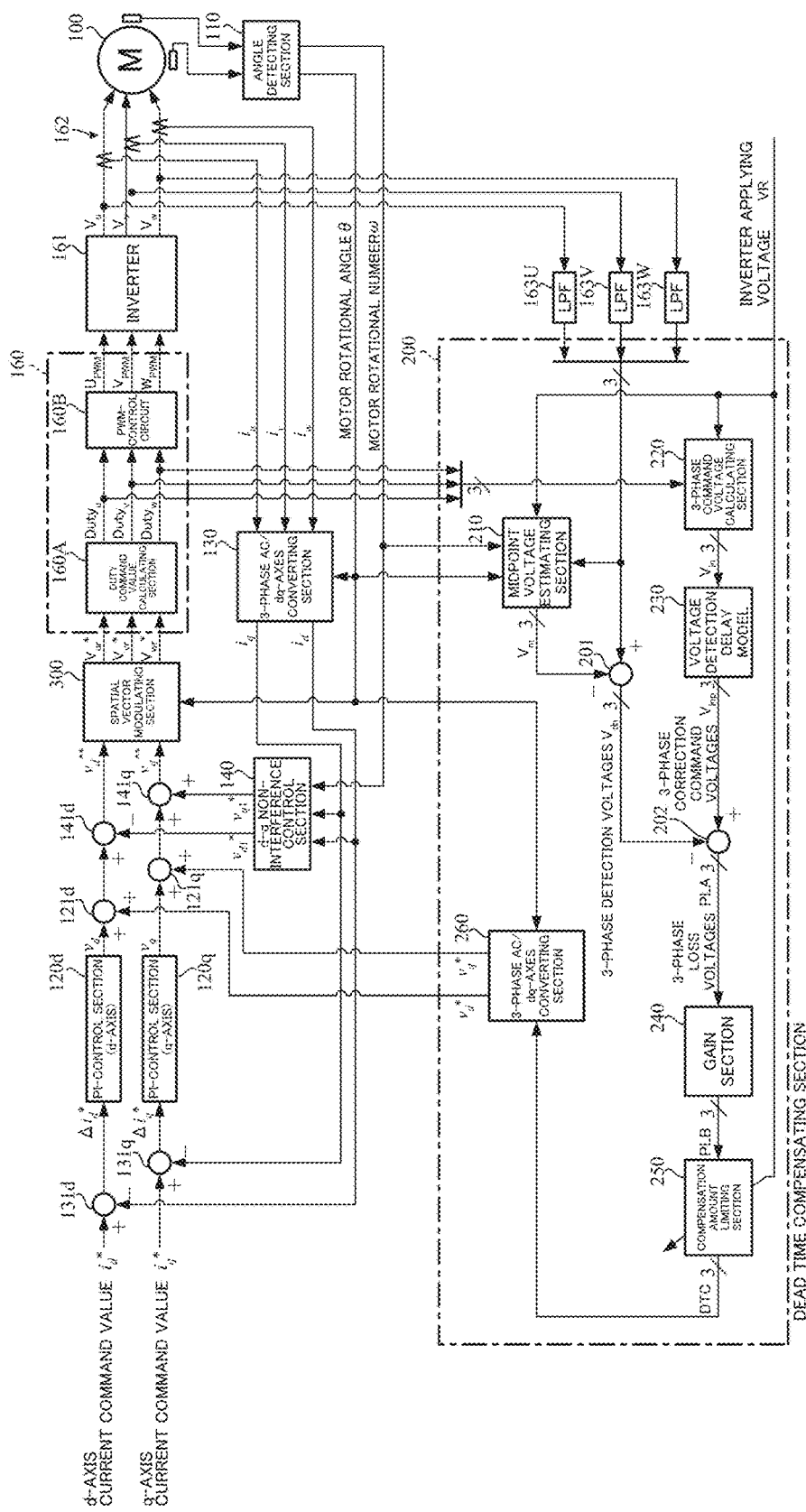
FIG. 5 is a block diagram showing a configuration example (the first embodiment) of the present invention.

FIG. 5 shows a whole configuration example (the first embodiment) of the present invention corresponding to FIG. 3, and there is provided a dead time compensating section 200 to calculate dead time compensation values vd* and vq* on the dq-axes. A motor rotational angle θ and a motor rotational number ω are inputted into the dead time compensating section 200, and further 3-phase duty command values duty$_u$, duty$_v$, duty$_w$ calculated at a duty command value calculating section 160A in the PWM-control section 160 and 3-phase motor terminal voltages Vu, Vv, Vw of the motor 100 are inputted into the dead time compensating section 200. The 3-phase motor terminal voltages Vu, Vv, Vw are inputted into the dead time compensating section 200 via low pass filters (LPFs) 163U, 163V, 163W for removing a high frequency noise, respectively. Further, PWM-signals (U$_{PWM}$, V$_{PWM}$, W$_{PWM}$) from a PWM-control circuit 160B in the PWM-control section 160 are inputted into the inverter 161, and an inverter applying voltage VR applied to the inverter 161 is inputted into the dead time compensating section 200.

A d-axis current command value id* and a q-axis current command value iq* calculated in a current command value calculating section (not shown) are respectively inputted into subtracting sections 131d and 131q, and current deviations Δid* and Δiq* for the feed back currents id and iq are respectively calculated in the subtracting sections 131d and 131q. The calculated current deviation Δid* is inputted into the PI-control section 120d, and the calculated current deviation Δiq is inputted into the PI-control section 120q. The PI-controlled d-axis voltage command value vd and q-axis voltage command value vq are inputted into the adding section 121d and 121q, the dead time compensation values vd* and vq* from the dead time compensating section 200 described below are added and compensated in the adding section 121d and 121q, and the compensated voltage values are respectively inputted into the subtracting section 141d and the adding section 141q. The voltage vd1* from the d-q non-interference control section 140 is inputted into the subtracting section 141d, and the voltage command value vd** being the difference is obtained. The voltage vq1* from the d-q non-interference control section 140 is inputted into the adding section 141q, and the voltage command value vq being the addition result is obtained. The voltage command value vd and vq** which are dead time-compensated are inputted into a spatial vector modulating section 300 that converts 2-phase of the dq-axes into 3-phases of U-phase, V-phase, W-phase and superposes the third harmonic wave. Voltages command values Vu*, Vv*, Vw* of 3-phases vector-modulated in the spatial vector modulating section 300 are inputted into the PWM-control section 160, and the motor 100 is driving-controlled via the PWM-control section 160 and the inverter 161 as described above.

Next, the dead time compensating section 200 will be described.

The dead time compensating section 200 comprises subtracting sections 201 (201U, 201V, 201W) and 202, a midpoint voltage estimating section 210, a 3-phase command voltage calculating section 220, a voltage detection delay model 230, a gain section 240, a compensation amount limiting section 250 and a 3-phase alternative current (AC)/dq-axes converting section 260.

Figure 6:
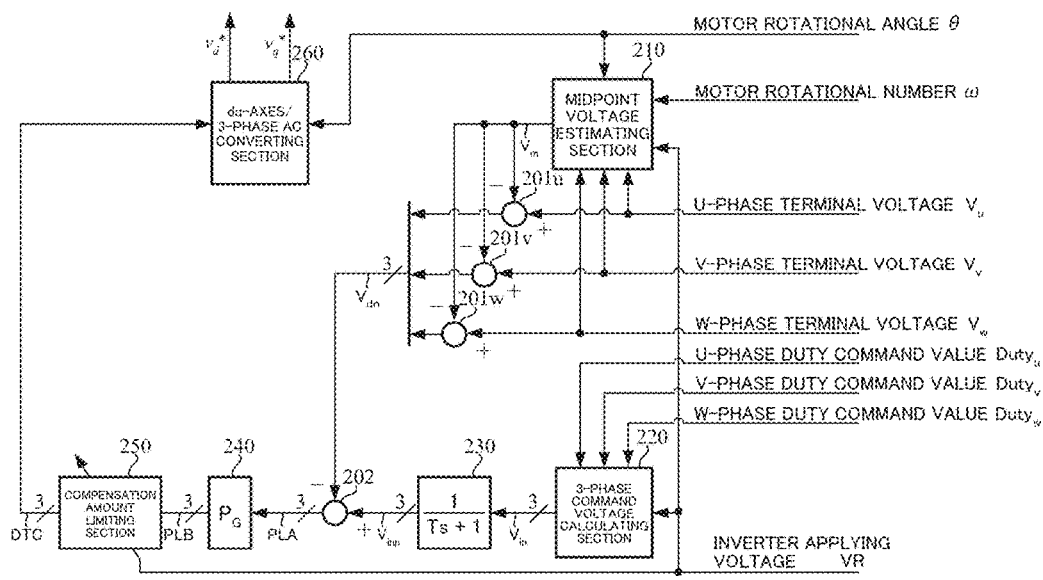
FIG. 6 is a block diagram in details showing a configuration example a dead time compensating section according to the present invention.

The detail configuration is shown in FIG. 6, the motor rotational angle θ is inputted into the midpoint voltage estimating section 210 and the 3-phase alternative current (AC)/dq-axes converting section 260, and the motor rotational number ω is inputted into the midpoint voltage estimating section 210. The motor terminal voltages Vu, Vv, Vw are inputted into the midpoint voltage estimating section 210 and the subtracting section 201 (201U, 201V, 201W) via LPFs 163U, 163V, 163W. Further, the duties Duty$_u$, Duty$_v$, Duty$_w$ from the duty command value calculating section 160A in the PWM-control section 160 are inputted into the 3-phase command voltage calculating section 220, and the inverter applying voltage VR is inputted into the midpoint voltage estimating section 210, the 3-phase command voltage calculating section 220 and the compensation amount limiting section 250.

Figure 7:
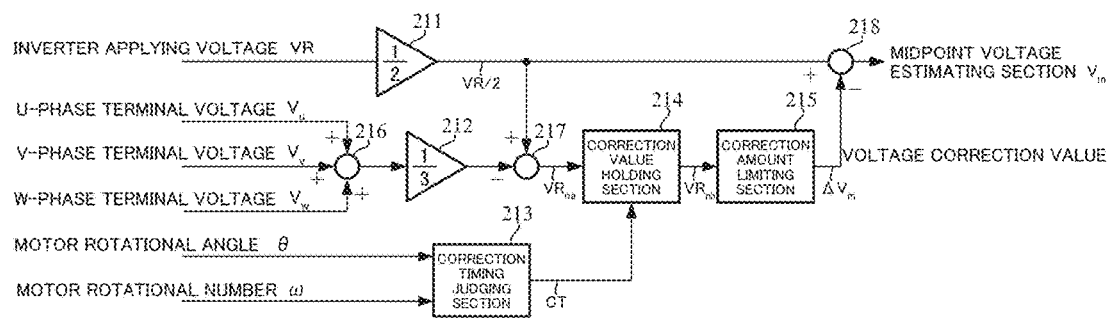
FIG. 7 is a block diagram showing a configuration example of the midpoint voltage estimating section.

The midpoint voltage estimating section 210 calculates a reference voltage of midpoint voltages by using the inverter applying voltage VR. The detail configuration is shown in FIG. 7, since the midpoint voltages vary depending on the influence of a hardware configuration, a detection error and so on, the correction is performed based on the differences between the inverter applying voltage VR and the motor terminal voltages Vu, Vv, Vw. The correction timing is adjusted by a condition of a specific motor rotational angle θ and a specific motor rotational number ω.

That is, the inverter applying voltage VR is reduce by half (VR/2) in a reducing section 211, and a reduced value (VR/2) is addition-inputted into subtracting sections 217 and 218. The motor terminal voltages Vu, Vv, Vw are inputted into the adding section 216 and added, the added result "Vu+Vv+Vw" is ⅓-multiplied in a dividing section (⅓) 212, and a ⅓-multiplied voltage "(Vu+Vv+Vw)/3" is subtraction-inputted into the subtracting section 217. The subtracting section 217 subtracts the voltage "(Vu+Vv+Vw)/3" from the reduce value VR/2, and the subtracted value VRna is inputted into a correction value holding section 214. A correction timing judging section 213 judges a correction timing based on the motor rotational angle θ and the motor rotational number ω and inputs a correction signal CT to the correction value holding section 214. The correction amount limiting section 215 calculates a voltage correction value ΔVm based on a voltage VRnb held in the correction value holding section 214.

Figure 8:
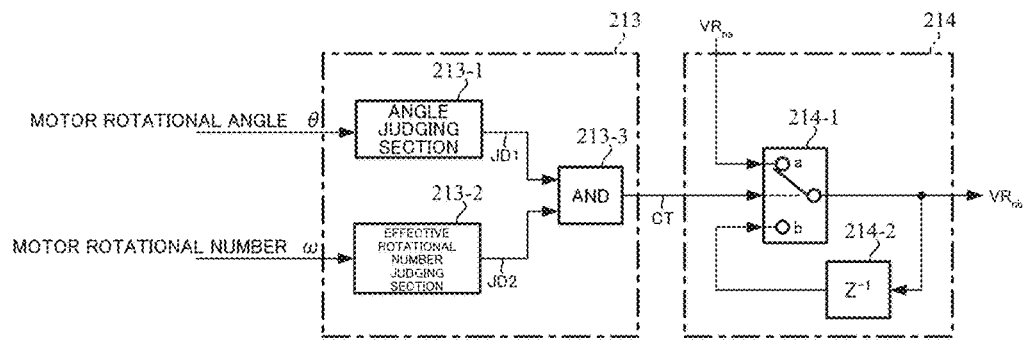
FIG. 8 is a block diagram showing a detail configuration example of the correction timing judging section and the correction value holding section.

The details of the correction timing judging section 213 and the correction value holding section 214 are shown in FIG. 8, the correction timing judging section 213 comprises an angle judging section 213-1, an effective rotational number judging section 213-2 and an AND-circuit 213-3, and the correction value holding section 214 comprises a switching section 214-1 and a holding unit 214-2.

That is, the motor rotational angle θ is inputted into the angle judging section 213-1 and the below Equation 1 is judged. When the Equation 1 is established, the angle judging section 213-1 outputs a judging signal JD1.

$$179 \text{ [deg]} < \theta < 180 \text{ [deg]} \qquad \text{[Equation 1]}$$

In a case that the timing of the above equation 1 is considered as the correction condition on the calculation of the midpoint correction value, it is possible to accurately sample a voltage value of a zero-cross point. Since the third harmonic wave is superposed on the motor terminal voltages except for the above point, it is impossible to detect more accurate value. For example, considering that the respective terminal voltages detected by the condition of the Equation 1 are Vu=6.83[V], Vv=7.55[V], Vw=5.94 [V] and the motor applying voltage is 13.52[V], "(Vu+Vv+Vw)/3"=6.77[V] and VR/2=6.76[V] are established, and therefore "VR/2≈(Vu+Vv+Vw)/3" near the midpoint voltage is obtained. Further, when the motor rotational number ω is great, since the influence of the motor back-EMF increases and the sampling precision goes down, it is impossible to perform the accurate correction calculation. Thus, the effective rotational number judging section 213-2 judges whether the motor rotational number ω is equal to or less than an effective rotational number $\omega_0$ being capable of correction-calculating, or not. When the motor rotational number ω is equal to or less than the effective rotational number $\omega_0$, the effective rotational number judging section 213-2 outputs the judging signal JD2.

$$\omega \leq \omega_0 \qquad \text{[Equation 2]}$$

The judging signals JD1 and JD2 are inputted into the AND-circuit 213-3, and the correction signal CT is outputted in accordance with the AND-condition that the inputted judging signals JD1 and JD2. The correction signal CT is inputted into the switching section 214-1 in the correction value holding section 214 as a switching signal and switches contact points "a" and "b". The subtracted result VRna is inputted into the contact point "a", and the output voltage VRnb is inputted into the contact point "b" via the holding unit ($Z^{-1}$) 214-2. The correction value holding section 214 holds a value in order to output a stable correction value till a next timing. Further, in a case that the correction amount is clearly greater than a normal value due to the noise, the back-EMF, the correction timing miss-judgment and so on, the correction amount limiting section 215 judges that the present correction amount is not right and limits the maximum value. The maximum limited voltage correction value ΔVm is inputted into the subtracting section 218, and the midpoint voltage estimation value Vm calculated in accordance with the below Equation 3 in the subtracting section 218 is outputted. The midpoint voltage estimation value Vm is subtraction-inputted into the subtracting sections 201 (201U, 201V, 201W).

$$V_m = \frac{VR}{2} - \Delta V_m \qquad \text{[Equation 3]}$$

Furthermore, the 3-phase duty command values $Duty_u$, $Duty_v$, $Duty_w$ and the inverter applying voltage VR are inputted into the 3-phase command voltage calculating section 220, and the 3-phase command voltage calculating section 220 calculates the 3-phase command voltage Vin by using the below Equation 4 in accordance with the 3-phase duty command values $Duty_u$, $Duty_v$, $Duty_w$ and the inverter applying voltage VR. The 3-phase command voltage Vin is inputted into the voltage detection delay model 230. As well, "$Duty_{ref}$" in the Equation 4 denotes $Duty_u$, $Duty_v$, $Duty_w$.

$$V_{in} = VR \times \frac{(Duty_{ref} - Duty_{50\%})}{Duty_{100\%}} \qquad \text{[Equation 4]}$$

The midpoint estimation value Vm is subtraction-inputted into the subtracting sections 201 (201U, 201V, 201W), and further the terminal voltages Vu, Vv, Vw passed the LPFs 163U, 163V, 163W are subtraction-inputted into the subtracting sections 201 (201U, 201V, 201W). The subtracting sections 201U, 201V, 201W subtract the midpoint estimation value Vm from the 3-phase motor terminal voltages Vu, Vv, Vw in accordance with the below Equation 5. Thereby, 3-phase detection voltages Vdn (Vdu, Vdv, Vdw) are obtained. The 3-phase detection voltages Vdn (Vdu, Vdv, Vdw) are inputted into the subtracting section 202 serving as a 3-phase loss voltage calculating section.

$$V_{du} = V_u - V_m$$

$$V_{dv} = V_v - V_m$$

$$V_{dw} = V_w - V_m \qquad \text{[Equation 5]}$$

The detection of the terminal voltages Vu, Vv, Vw causes a delay due to a noise filter or the like in the ECU. Consequently, in a case that the loss voltages are directly calculated by obtaining the differences between the 3-phase command value voltages Vin and the 3-phase detection voltages Vdn, the error occurs due to the phase difference. In order to resolve this problem, the present embodiment approximates the detection delay of the hardware such as a filter circuit as a first order filter model and improves the phase difference. The voltage detection delay model 230 of the present embodiment is a primary filter of the below Equation 6 and "T" denotes a time constant. The voltage detection delay model 230 may be a model of a secondary filter or more order filter.

$$\frac{1}{Ts+1} \qquad \text{[Equation 6]}$$

The 3-phase correction command voltages Vinp from the voltage detection delay model 230 are addition-inputted into the subtracting section 202, and the 3-phase detection voltages Vdn are subtraction-inputted into the subtracting section 202. The 3-phase loss voltages PLA (Vloss_n) are calculated by subtracting the 3-phase detection voltages Vdn from the 3-phase correction command voltages Vinp. That is, the subtracting section 202 performs the below Equation 7.

$$V_{loss\_u} = V_{inu} - V_{du}$$

$$V_{loss\_v} = V_{inv} - V_{dv}$$

$$V_{loss\_w} = V_{inw} - V_{dw} \qquad \text{[Equation 7]}$$

The 3-phase loss voltages PLA (Vloss_n) are multiplied by a gain $P_G$ (e.g. 0.8) in the gain section 240, and the 3-phase loss voltages PLA multiplied by the gain $P_G$ are inputted into the compensation amount limiting section 250. Although the gain $P_G$ is not basically needed to adjust, it is changed when an output adjustment is needed so that the adjustment for another compensators, actual vehicles tuning, parts of the ECU are changed.

Figure 9:
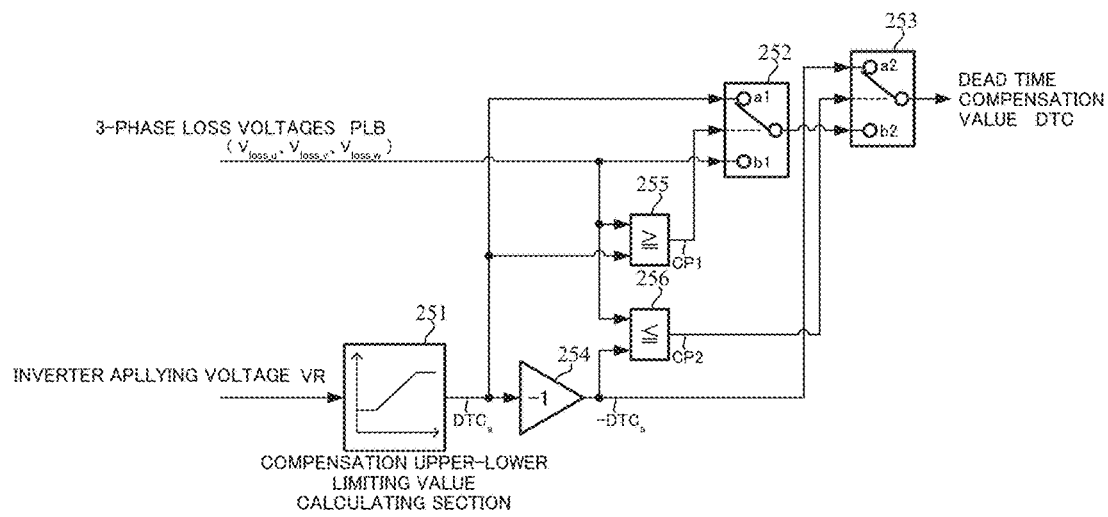
FIG. 9 is a block diagram showing a detail configuration example of the correction amount limiting section.
Figure 10:
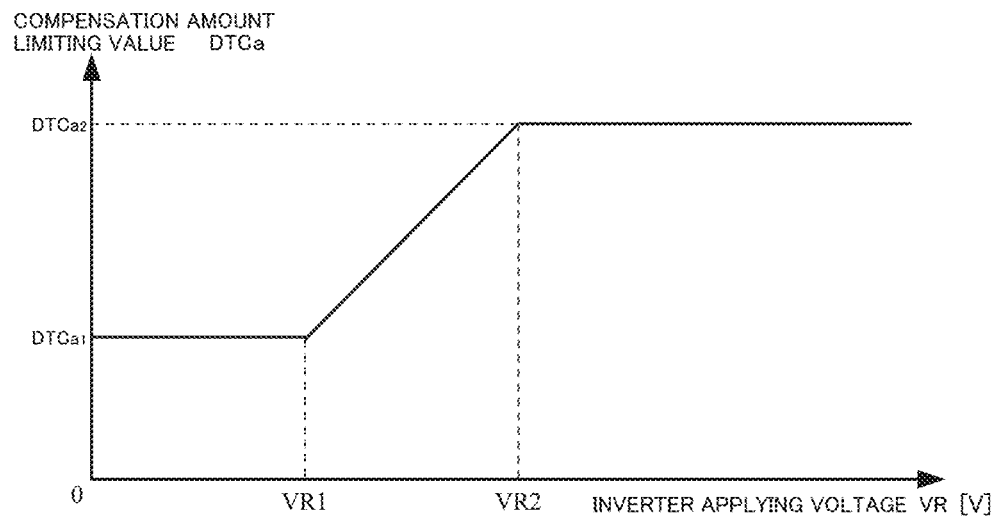
FIG. 10 is a characteristic diagram showing an example of the compensation amount limiting value.

The compensation amount limiting section 250 is sensitive to the inverter applying voltage VR, and the detail configuration is shown in FIG. 9. The inverter applying voltage VR is inputted into a compensation upper-lower limiting value calculating section 251 in the compensation amount limiting section 250, and a compensation amount limiting value DTCa is calculated with a characteristic as shown in FIG. 10. The compensation amount limiting value DTCa is a constant limiting value DTCa1 till a predetermined voltage VR1, linearly (or non-linearly) increases between the predetermined voltage VR1 and a predetermined voltage VR2 (>VR1), and holds a constant limiting value DTCa2 more than the predetermined voltage VR2. The compensation amount limiting value DTCa is inputted into a contact point a1 of the switching section 252 and a comparing section 255 as well as an inverting section 254. Further, the 3-phase loss voltages PLB (Vloss_u, Vloss_v, Vloss_w) are inputted into comparing sections 255 and 256 as well as a contact point b1 of the switching section 252. An output "−DTCa" of the inverting section 254 is inputted into a contact point a2 of the switching section 253. The contact points a1 and b1 are switched based on a comparison result CP1 of the comparing section 255, and the contact points a2 and b2 are switched based on a comparison result CP2 of the comparing section 256.

The comparing section 255 compares the compensation amount limiting value DTCa with the 3-phase loss voltages PLB and switches the contact points a1 and b1 of the switching section 252 in accordance with the below Equation 8. Further, the comparing section 256 compares the compensation amount limiting value "−DTCa" with the 3-phase loss voltages PLB and switches the contact points a2 and b2 of the switching section 253 in accordance with the below Equation 9.

When the 3-phase loss voltages *PLB*≥the compensation amount upper-limiting value (*DTCa*), the contact point *a*1 of the switching section 252 is ON (the contact point *b*2 of the switching section 253=*DTCa*).

When the 3-phase loss voltages *PLB*<the compensation amount upper-limiting value (*DTCa*), the contact point *b*1 of the switching section 252 is ON (the contact point *b*2 of the switching section 253=the 3-phase loss voltages *PLB*). [Equation 8]

When the 3-phase loss voltages *PLB*≤the compensation amount lower-limiting value (−*DTCa*), the contact point *a*2 of the switching section 253 is ON (the dead time compensation value *DTC*=−*DTCa*).

When the 3-phase loss voltages *PLB*>the compensation amount lower-limiting value (−*DTCa*), the contact point *b*2 of the switching section 253 is ON (the dead time compensation value *DTC*=the output of the switching section 252). [Equation 9]

As described above, the present embodiment estimates the 3-phase voltages by detecting the 3-phase motor terminal voltages, calculates the 3-phase correction command voltages from the 3-phase duty command values, and calculates the loss voltages due to the dead time of the inverter from the differences therebetween. From the calculated loss voltages, in a case that the compensation amount exceeding the upper-limit, the present embodiment judges the disturbance due to the back-EMF or the like and calculates the loss due to the dead time by limiting the compensation values. Further, it is possible to compensate the dead time even on the dq-axes by converting the calculated loss voltages into the dq-axes and feeding back to the dq-axes as the compensation values.

Figure 11:
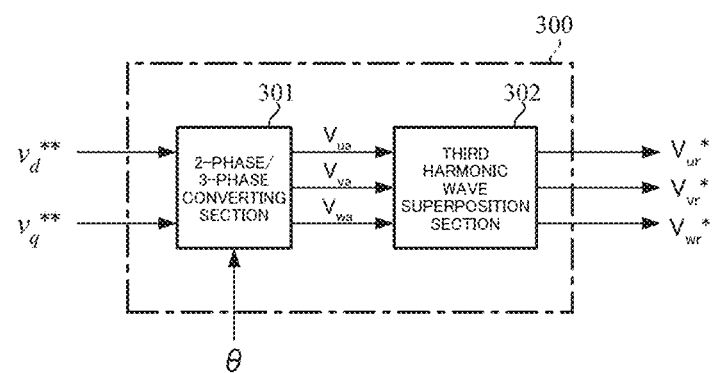
FIG. 11 is a block diagram showing a configuration example of the spatial vector modulating section.

Next, the spatial vector modulation will be described. All the spatial vector modulating section 300 having functions have a function that converts 2-phase voltages (vd**, Vq*) on the dq-axes space into 3-phase voltages (Vua, Vva, Vwa) and a third harmonic waveform to the 3-phase voltages (Vua, Vva, Vwa) as shown in FIG. 11. For example, the spatial vector modulating methods proposed in Japanese Publication Unexamined Patent No. 2017-70066, WO/2017/098840 (Japanese Patent Application No. 2015-239898) and so on by the present applicant may be used.

Figure 12:
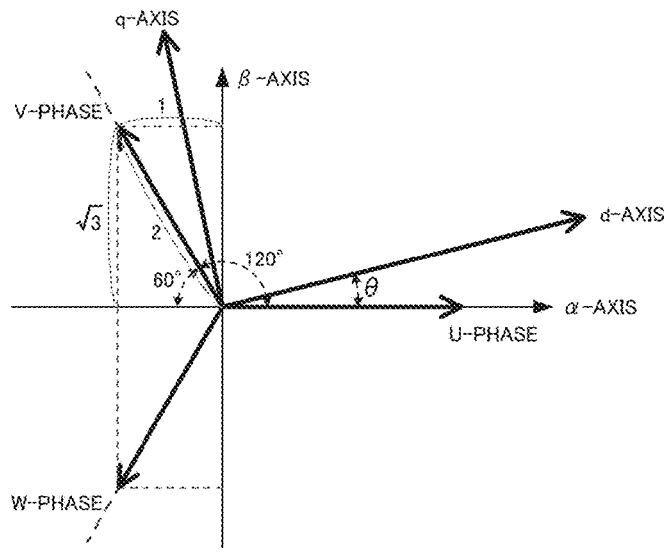
FIG. 12 is a diagram showing an operation example of the spatial vector modulating section.

That is, the spatial vector modulation performs the below coordinate transformation based on the voltage command values vd and q of the dq-axes space, the motor rotational angle θ and a sector number n (#1 to #6), and controls ON/OFF of the FETs (upper-arm Q1, Q3, Q5; lower-arm Q2, Q4, Q6) of the bridge type inverter. By supplying switching patterns S1 to S6 corresponding to the sectors #1 to #6 to the motor, it has a function to control the rotation of the motor. Regarding the coordinate transformation, in the spatial vector modulation, the voltage command values vd and vq** are coordinate-transformed to voltage vectors Vα and Vβ on an α-β coordinate system based on the below Equation 10. A relation between the coordinate axis and the motor rotational angle θ used in the above coordinate transformation, is shown in FIG. 12.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \quad \text{[Equation 10]}$$

There is a relation expressed by the below Equation 11 between the target voltage vector on the d-q coordinate system and the a target voltage vector on the α-β coordinate system, and an absolute value of the target voltage vector V is held.

$$|V| = \sqrt{(v_d^{})_2 + (v_q^{})_2} = \sqrt{V\alpha^2 + V\beta^2} \quad \text{[Equation 11]}$$

Figure 13:
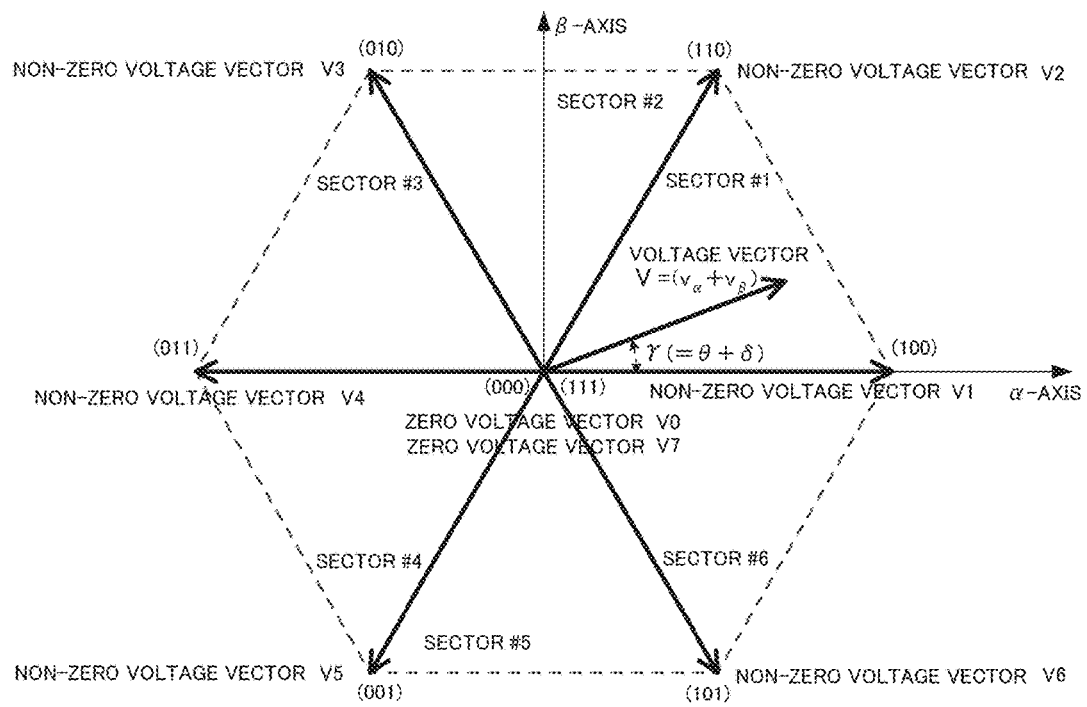
FIG. 13 is a diagram showing an operation example of the spatial vector modulating section.

In the switching patterns of the spatial vector control, the output voltages of the inverter are defined with 8-kinds discrete reference output voltage vectors V0 to V7 (non-zero voltage vectors V1 to V6 of which phases are different by π/3 [rad] and zero voltage vectors V0, V7) shown in the spatial vector diagram of FIG. 13 corresponding to the switching patterns S1 to S6 of the FETs (Q1 to Q6). The selection of the reference output voltage vectors V0 to V7 and the occurrence time thereof are controlled. It is possible to divide the spatial vectors into the six sectors #1 to #6 by using six regions sandwiched with adjacent reference output voltage vectors. The target voltage vector belongs to any one of the sectors #1 to #6, and it is possible to allot the sector number. It is possible to obtain based on the rotational angle γ in the α-β coordinate system of the target voltage vector V that the target voltage vector V being the synthetic vector of Vα and Vβ exists any one of the sectors shown in FIG. 13 sectioned to the regular hexagonal shape in the α-β space. The rotational angle γ is determined by "γ=θ+δ" as an addition of the phase δ obtained from a relation between the motor rotational angle θ and the voltage command values vd and vq in the d-q coordinate system.

Figure 14:
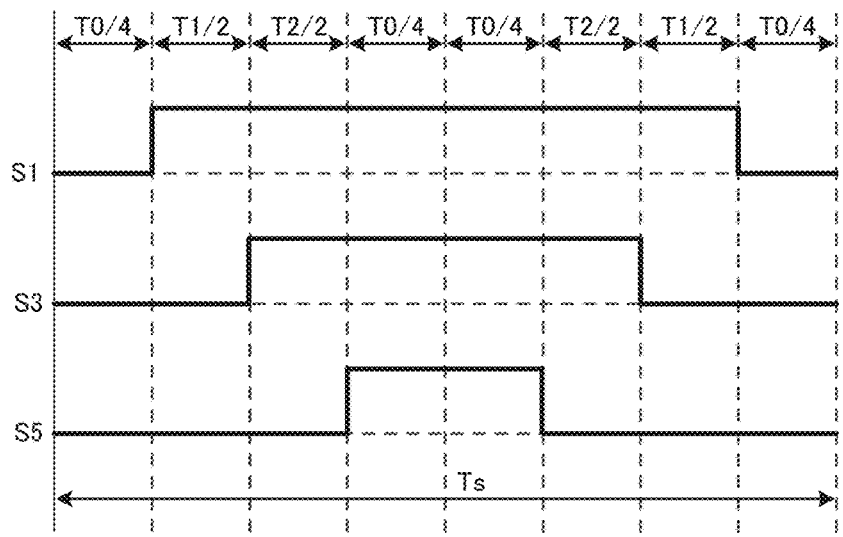
FIG. 14 is a timing chart showing an operation example of the spatial vector modulating section.

FIG. 14 shows a basic timing chart to determine, with the digital control due to the switching patterns S1, S3, S5 of the inverter in the spatial vector control, the switching pulse width and the timing in ON/OFF signals S1 to S6 (switching patterns) for the FETs in order to output the target voltage vector V from the inverter. The spatial vector modulation performs the calculation and the like at a every prescribed sampling term Ts within the sampling term Ts, and converts the calculated result into the respective switching pulse widths and the timings of the switching patterns S1 to S6 at a next sampling term Ts and then outputs.

The spatial vector modulation generates the switching patterns S1 to S6 corresponding to the sector numbers obtained based on the target voltage vector V. In FIG. 14, an example of the witching patterns S1 to S6 of the FETs of the inverter in a case of the sector number #1 (n=1) is shown. The signals S1, S3, S5 indicate gate signals of the FETs Q1, Q3, Q5 corresponding to the upper-arm. The horizontal axis is a time, and "Ts" corresponds to a switching period and is divided into 8-periods comprising T0/4, T1/2, T2/2, T0/4, T0/4, T2/2, T1/2 and T0/4. The terms T1 and T2 are respectively times depending on the sector number n and rotational angel γ.

Figure 15:
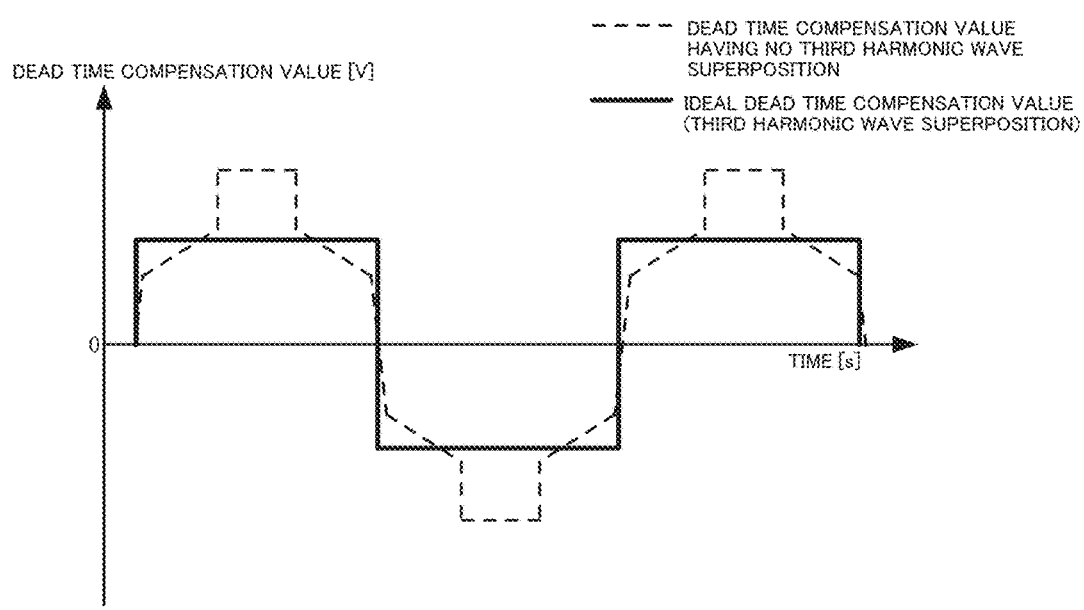
FIG. 15 is a waveform chart showing an effect of the spatial vector modulating section.

In a case that there is no the spatial vector modulation, the dead time compensation value waveform (the U-phase waveform) that dead time compensation of the present invention is applied on the dq-axes and only the dead time compensation values are dq-axes/3-phase-converted, is a waveform removed the third harmonic component as shown by a dashed-line in FIG. 15. The V-phase and the W-phase are also same. By adopting the spatial vector modulation instead of the dq-axes/3-phase conversion, it is possible to superpose the third harmonic wave to 3-phase signals and further to make up for the third harmonic component being wanting due to the 3-phase conversion. Thereby, it is possible to generate the ideal dead time compensation waveform as shown by a real line of FIG. 15.

Figure 16:
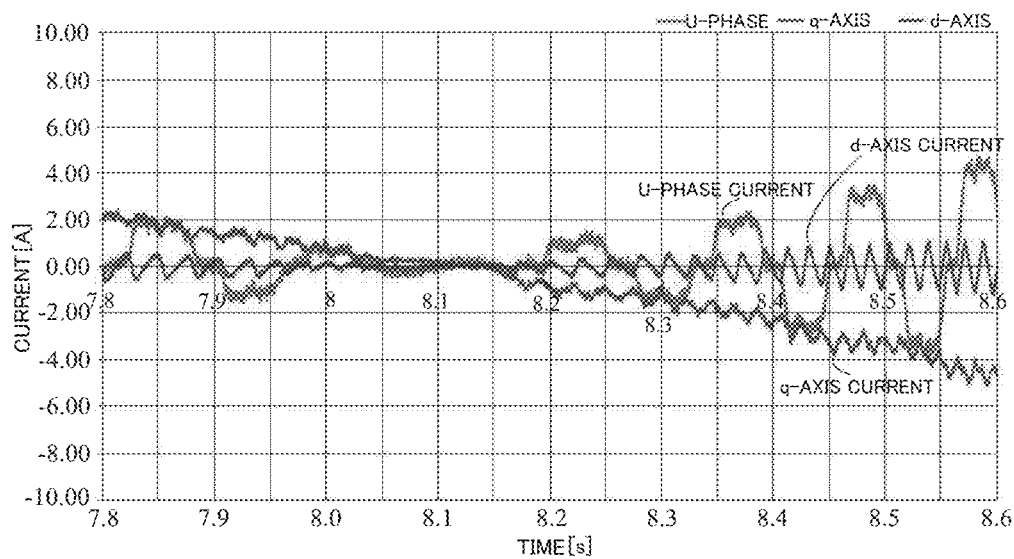
FIG. 16 is a waveform chart showing an effect of the present invention (the first embodiment)
Figure 17:
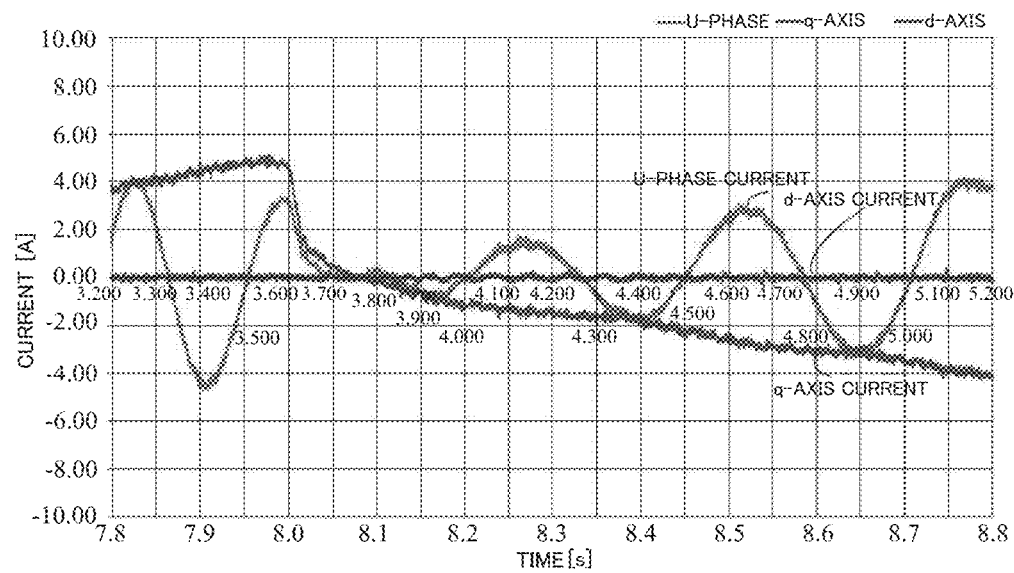
FIG. 17 is a waveform chart showing an effect of the present invention (the first embodiment)

FIG. 16 and FIG. 17 are simulation results to show the advantageous effects of the present invention (the first embodiment), and FIG. 16 indicates the U-phase current, the d-axis current and the q-axis current without the dead time compensation. By applying the dead time compensation of the present embodiment, it is confirmed that the improvement of the wave distortions of the phase currents and the dq-axes currents appears in the low load and the low speed steering maneuver as shown in FIG. 17. The improvement of the torque ripple in the steering maneuver and the improvement of the steering sound appeared. As well, FIG. 16 and FIG. 17 typically show the U-phase current.

Next, the second embodiment will be described with reference to FIG. 18.

Figure 18:
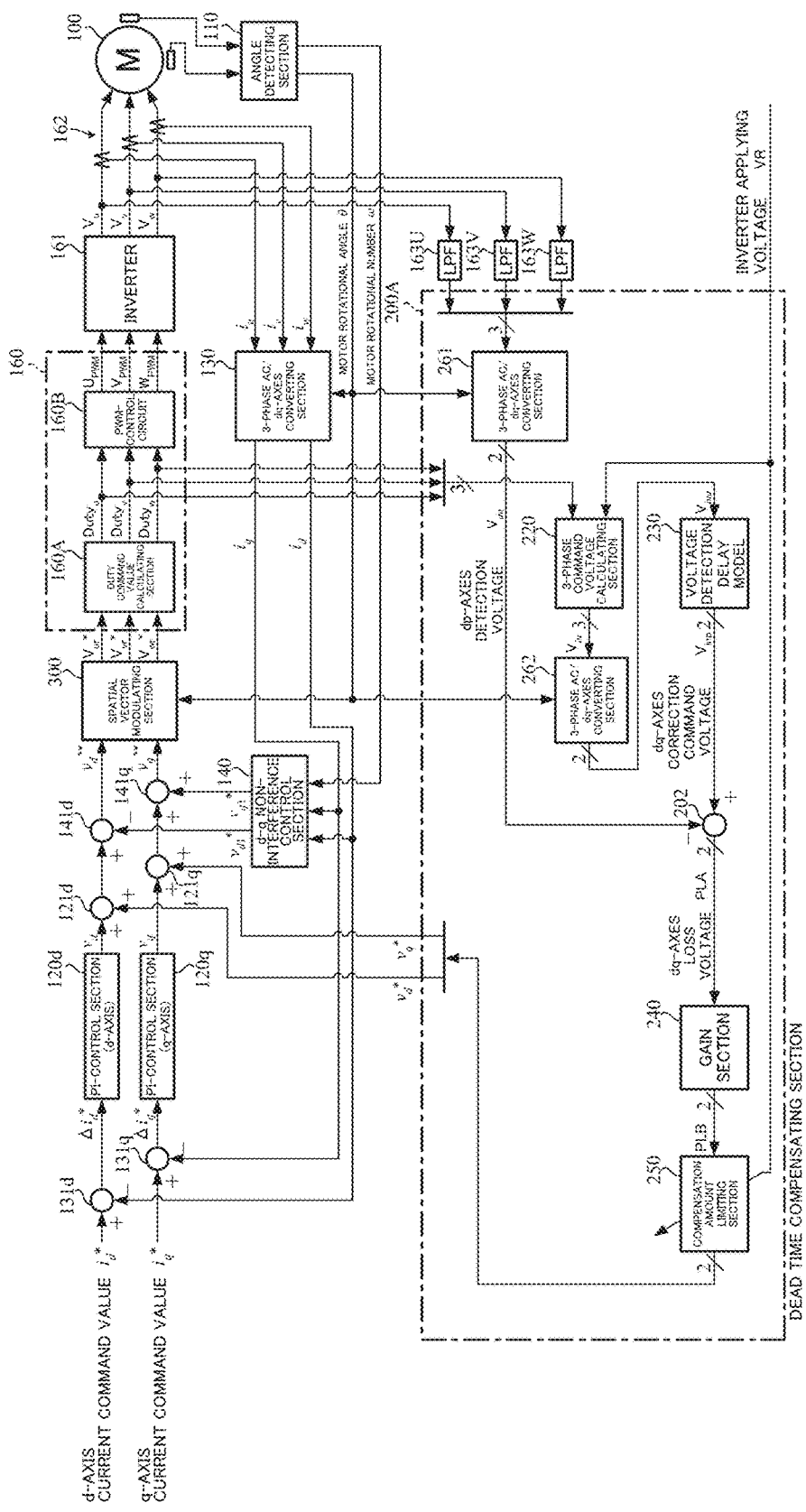
FIG. 18 is a block diagram showing a configuration example (the second embodiment) of the present invention.

FIG. 18 shows a whole configuration example of the second embodiment of the present invention corresponding to FIG. 5, and there is provided a dead time compensating section 200A to calculate the dead time compensation values vd* and vq* on the dq-axes. The dead time compensating section 200A is mainly processed on the 2-phases of the dq-axes, and is different from the dead time compensating section 200 of the first embodiment which is mainly processed by the 3-phases. In this connection, the 3-phase AC/dq-axes converting section 260 and the midpoint voltage estimating section 210 of the first embodiment are removed, and 3-phase AC/dq-axes converting sections 261 and 262 are newly provided.

The 3-phase motor terminal voltages Vu, Vv, Vw of the motor 100 are inputted into the 3-phase AC/dq-axes converting sections 261 via LPFs 163U, 163V, 163W for removing the high frequency noise, respectively, and are converted into dq-axes detection voltages Vdn (Vd, Vq) in synchronous with the motor rotational angle θ at the 3-phase AC/dq-axes converting sections 261. The dq-axes detection voltages Vdn (Vd, Vq) are subtraction-inputted into the subtracting section 202. Further, the 3-phase duty command values Duty$_u$, Duty$_v$, Duty$_w$ and the inverter applying voltage VR are inputted into the 3-phase command voltage calculating section 220, and the 3-phase command voltage calculating section 220 calculates the 3-phase command voltage Vin by using the above Equation 4. The 3-phase command voltage Vin is inputted into the 3-phase AC/dq-axes converting section 262 and converted into dq-axes command voltages Vina, and the dq-axes command voltages Vina are inputted into the voltage detection delay model 230.

The operation of the voltage detection delay model 230 is entirely same with the first embodiment except for the 2-phases, and improves the phase differences by approximating as the primary filter model as expressed by the above Equation 6. The dq-axes command voltages Vina from the voltage detection delay model 230 are addition-inputted into the subtracting section 202 as the loss voltage calculating section. The dq-axes loss voltages PLA (Vloss_d, Vloss_q) are calculated by subtracting the dq-axes command voltages Vin from the 3-phase AC/dq-axes converting section 261. That is, the subtracting section 202 performs the below Equation 12.

$$V_{loss\_d} = V_{ind} - V_d$$

$$V_{loss\_q} = V_{inq} - V_q \quad \text{[Equation 12]}$$

Figure 19:
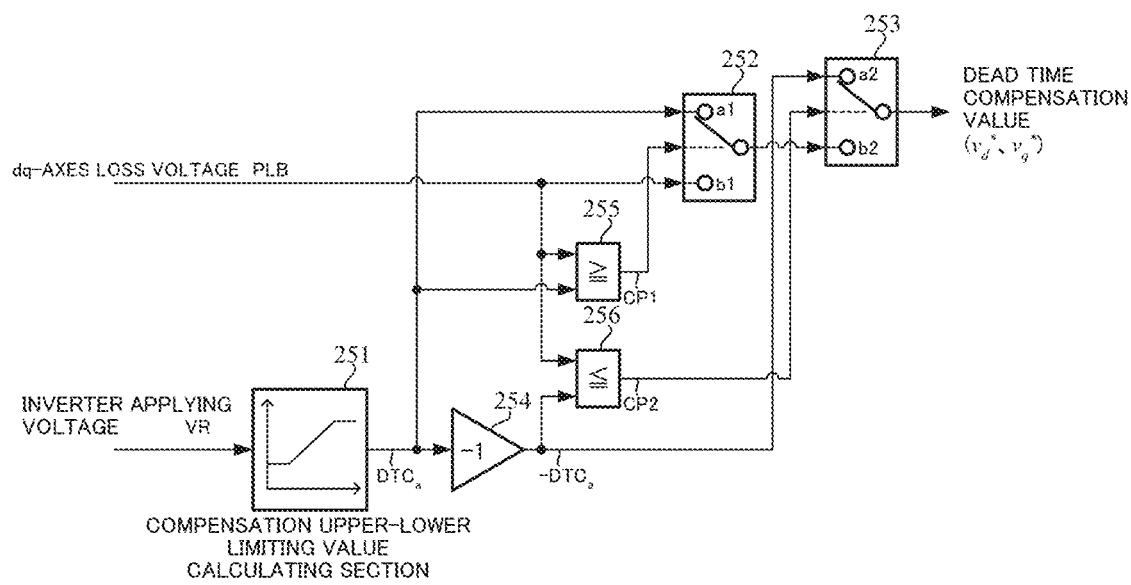
FIG. 19 is a block diagram showing a configuration example of the compensation mount limiting section.

The dq-axes loss voltages PLA (Vloss_d, Vloss_q) are multiplied by a gain P$_G$ (e.g. 0.8) in the gain section 240, and the dq-axes loss voltages PLA multiplied by the gain P$_G$ are inputted into the compensation amount limiting section 250. Although the gain P$_G$ is not basically needed to adjust, it is changed when an output adjustment is needed so that the adjustment for another compensators, actual vehicles tuning, parts of the ECU are changed. The operation and the configuration of the compensation amount limiting section 250 are same with the first embodiment except for the 2-phases, and dq-axes loss 2-voltages PLB (Vloss_d, Vloss_q) of 2-phases are inputted into the compensation amount limiting section 250 as shown in FIG. 19 instead of the 3-phase loss voltages PLB (Vloss_u, Vloss_v, Vloss_w) of FIG. 9. Another configuration is same in FIG. 9 and FIG. 19, the compensation amount limiting section 250 of the present embodiment outputs the dead tie compensation values vd and vq in accordance with the below Equations 13 and 14 as well as the characteristic of FIG. 13, and the dead tie compensation values vd and vq are respectively inputted into the adding sections 121d and 121q on the dq-axes.

When the dq-axes loss voltages PLB≥the compensation amount upper-limiting value (DTCa), the contact point a1 of the switching section 252 is ON (the contact point b2 of the switching section 253=DTCa).

When the dq-axes loss voltages PLB<the compensation amount upper-limiting value (DTCa), the contact point b1 of the switching section 252 is ON (the contact point b2 of the switching section 253=the dq-axes loss voltages PLB). [Equation 13]

When the dq-axes loss voltages PLB≤the compensation amount lower-limiting value (−DTCa), the contact point a2 of the switching section 253 is ON (the dead time compensation value DTC=−DTCa).

When the dq-axes loss voltages PLB>the compensation amount lower-limiting value (−DTCa), the contact point b2 of the switching section 253 is ON (the dead time compensation value DTC=the output of the switching section 252). [Equation 14]

As described above, the present embodiment detects the dq-axes detection voltages by detecting the 3-phase motor terminal voltages, calculates the dq-axes correction command voltages from the 3-phase duty command values, and calculates the loss voltages due to the dead time of the inverter from the differences therebetween. From the calculated loss voltages, in a case that the compensation amount exceeding the upper-limit, the present embodiment judges the disturbance due to the back-EMF or the like and calculates the loss due to the dead time by limiting the compensation values. Further, it is possible to compensate the dead time even on the dq-axes by converting the calculated loss voltages into the dq-axes and feeding back to the dq-axes as the compensation values.

Figure 20:
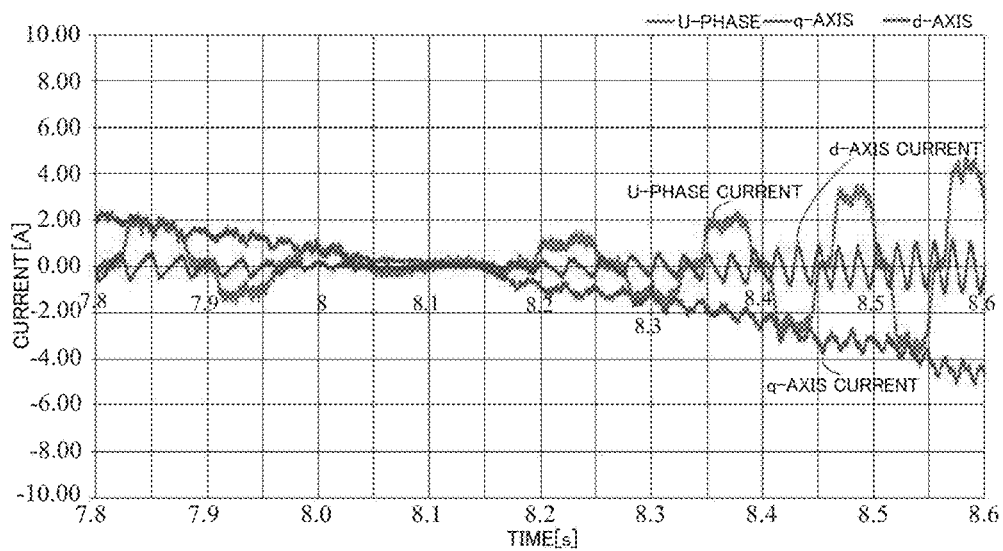
FIG. 20 is a waveform chart showing an effect of the present invention (the second embodiment)
Figure 21:
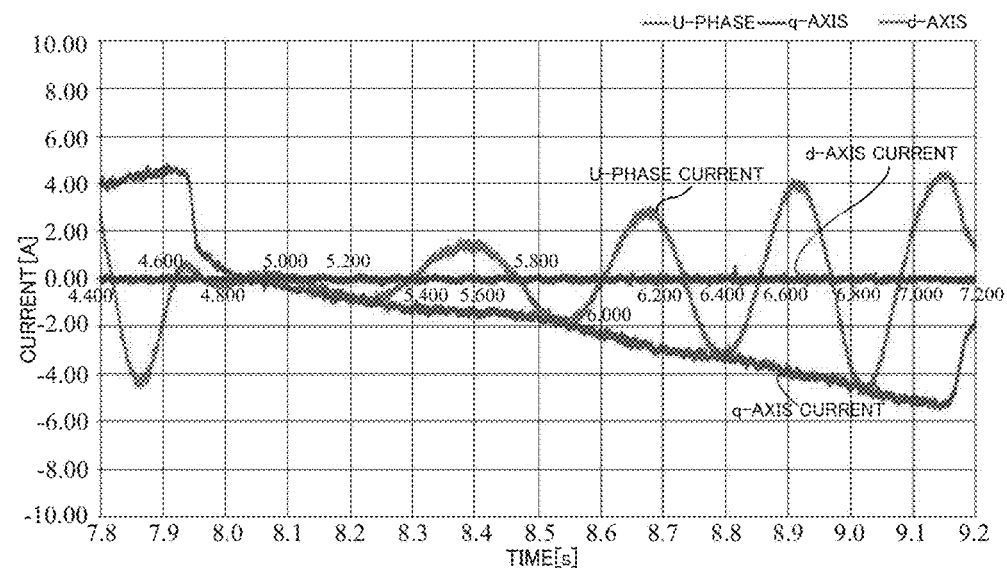
FIG. 21 is a waveform chart showing an effect of the present invention (the second embodiment)

FIG. 20 and FIG. 21 are simulation results to show the advantageous effects of the present invention (the second embodiment) regarding the U-phase, and FIG. 20 indicates the U-phase current, the d-axis current and the q-axis current without the dead time compensation. By applying the dead time compensation of the present embodiment, it is confirmed that the improvement of the wave distortions of the phase currents and the dq-axes currents appears in the low load and the low speed steering maneuver as shown in FIG. 21. The improvement of the torque ripple in the steering maneuver and the improvement of the steering sound appeared.

The third embodiment will be described with reference to FIG. 22.

Figure 22:
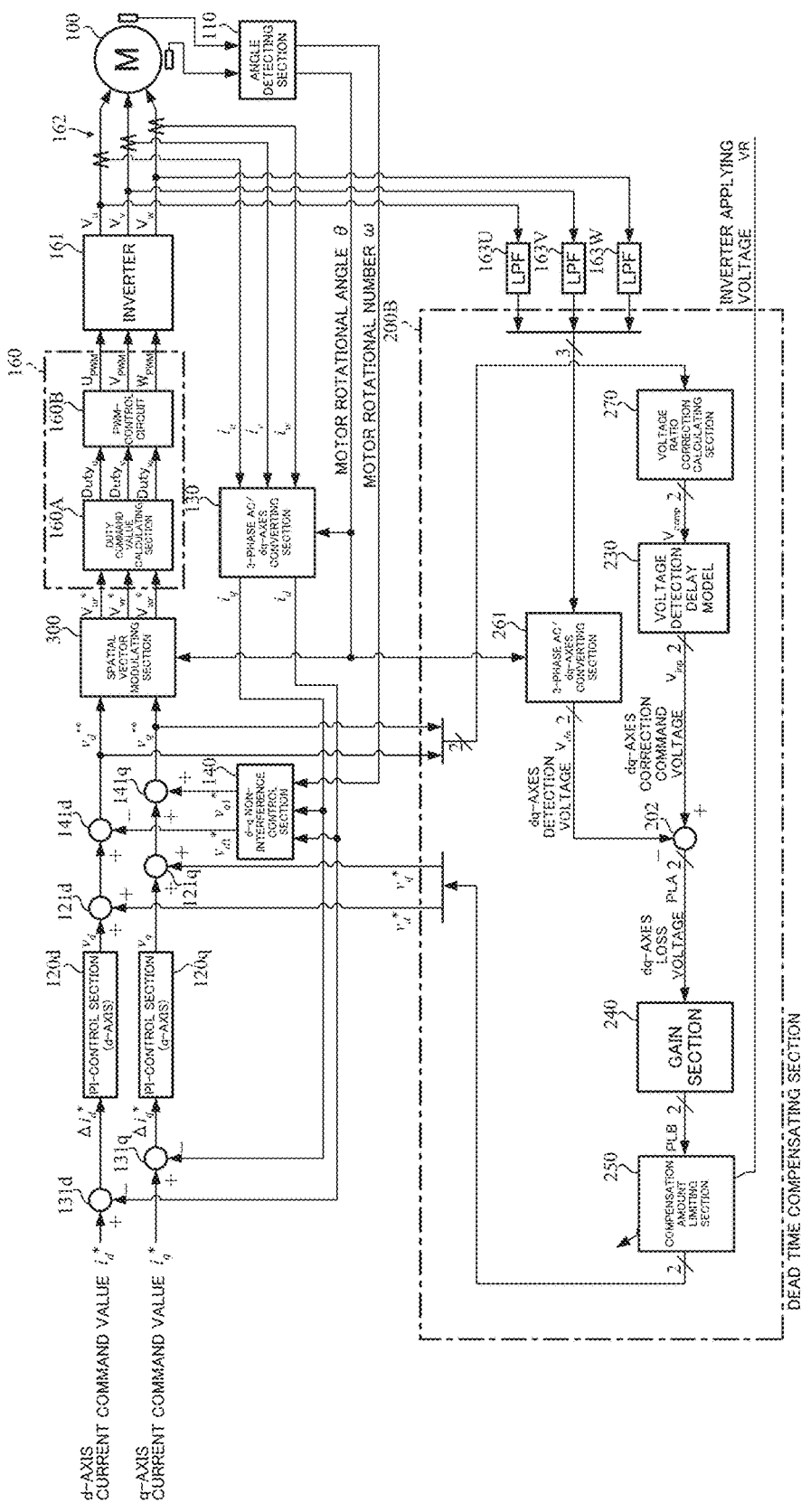
FIG. 22 is a block diagram showing a configuration example (the third embodiment) of the present invention.

FIG. 22 shows a whole configuration example of the third embodiment of the present invention corresponding to FIG. 18, and there is provided a dead time compensating section 200B to calculate the dead time compensation values vd* and vq* on the dq-axes. The dead time compensating section 200B is mainly processed on the 2-phases of the dq-axes in similar to the second embodiment, and the 3-phase AC/dq-axes converting section 262 and the 3-phase command voltage calculating section 220 of the second embodiment are removed, and a voltage ratio correction calculating section 270 inputting the voltage command values vd and vq is newly provided.

The 3-phase motor terminal voltages Vu, Vv, Vw of the motor 100 are inputted into the 3-phase AC/dq-axes converting sections 261 via LPFs 163U, 163V, 163W for removing the high frequency noise, respectively, and are converted into dq-axes detection voltages Vdn (Vd, Vq) in synchronous with the motor rotational angle θ at the 3-phase AC/dq-axes converting sections 261. The detection voltages Vdn (Vd, Vq) are subtraction-inputted into the subtracting section 202 serving as a loss voltage detecting section. The d-axis voltage command value vd and q-axis voltage command value vq are inputted into the voltage ratio correction calculating section 270, the voltage ratio correction calculating section 270 calculates dq-axes command voltages Vcom (Vcomp_d, Vcomp_q) by using the below Equation 15. Here, "PWM_Time" is a PWM-period and DT means the dead time. The dq-axes command voltages Vcom (Vcomp_d, Vcomp_q) are inputted into the voltage detection delay model 230.

$$V_{comp\_d} = \frac{PWM\_Time}{PWM\_Time + 2 \times DT} \times v_d^{**}$$ [Equation 15]

$$V_{comp\_q} = \frac{PWM\_Time}{PWM\_Time + 2 \times DT} \times v_q^{**}$$

The operation of the voltage detection delay model 230 is entirely same with the second embodiment, and improves the phase differences by approximating as the primary filter model as expressed by the above Equation 6. The dq-axes correction command voltages Vinp (Vind, Vinq) from the voltage detection delay model 230 are addition-inputted into the subtracting section 202 serving as the loss voltage calculating section. The dq-axes loss voltages PLA (Vloss_d, Vloss_q) are calculated by subtracting the dq-axes detection voltages Vdn from the dq-axes correction command voltages Vinp as expressed by the above Equation 12.

As described above, the present embodiment detects the dq-axes detection voltages by detecting the 3-phase terminal voltages, calculates the dq-axes command voltages from the dq-axes voltage command values, further calculates the dq-axes correction command voltages, and calculates the loss voltages due to the dead time of the inverter from the differences for the dq-axes detection voltages. From the calculated loss voltages, in a case that the compensation amount exceeding the upper-limit, the present embodiment judges the disturbance due to the back-EMF or the like and calculates the loss due to the dead time by limiting the compensation values. Further, it is possible to compensate the dead time even on the dq-axes by converting the calculated loss voltages into the dq-axes and feeding back to the dq-axes as the compensation values.

Figure 23:
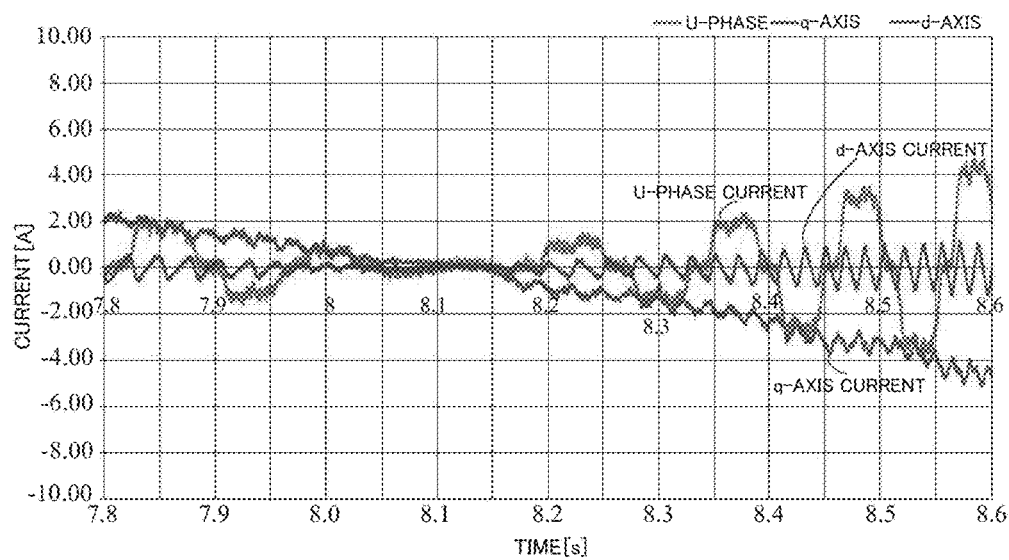
FIG. 23 is a waveform chart showing an effect of the present invention (the third embodiment)
Figure 24:
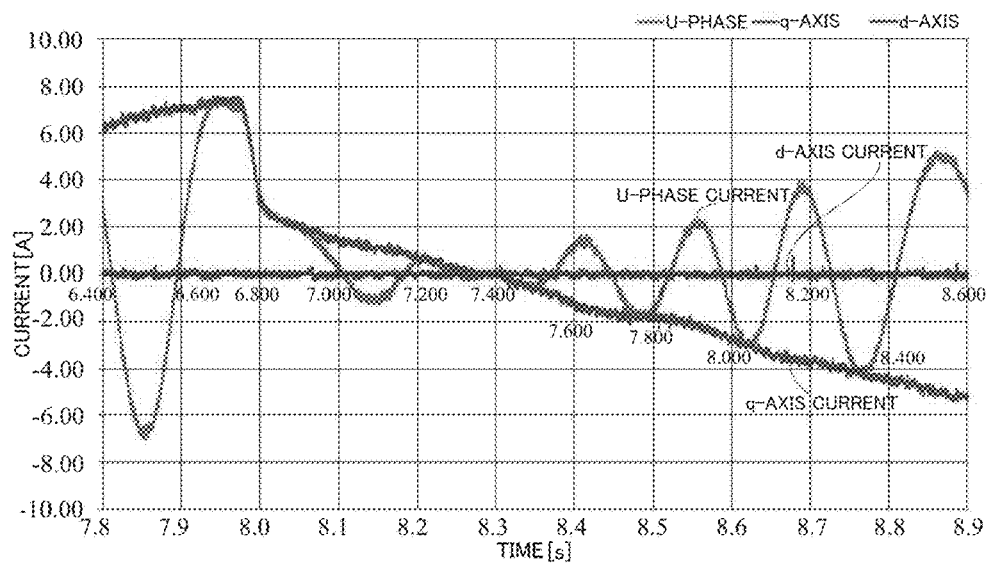
FIG. 24 is a waveform chart showing an effect of the present invention (the third embodiment)

FIG. 23 and FIG. 24 are simulation results to show the advantageous effects of the present invention (the third embodiment) regarding the U-phase, and FIG. 23 indicates the U-phase current, the d-axis current and the q-axis current without the dead time compensation. By applying the dead time compensation of the present embodiment, it is confirmed that the improvement (ripple of the dq-axes current waveform is little, the current waveform is near a sine-wave) of the wave distortions of the phase currents and the dq-axes currents appears in the low load and the low speed steering maneuver as shown in FIG. 24. The improvement of the torque ripple in the steering maneuver and the improvement of the steering sound appeared.

Next, the fourth embodiment will be described.

Figure 25:
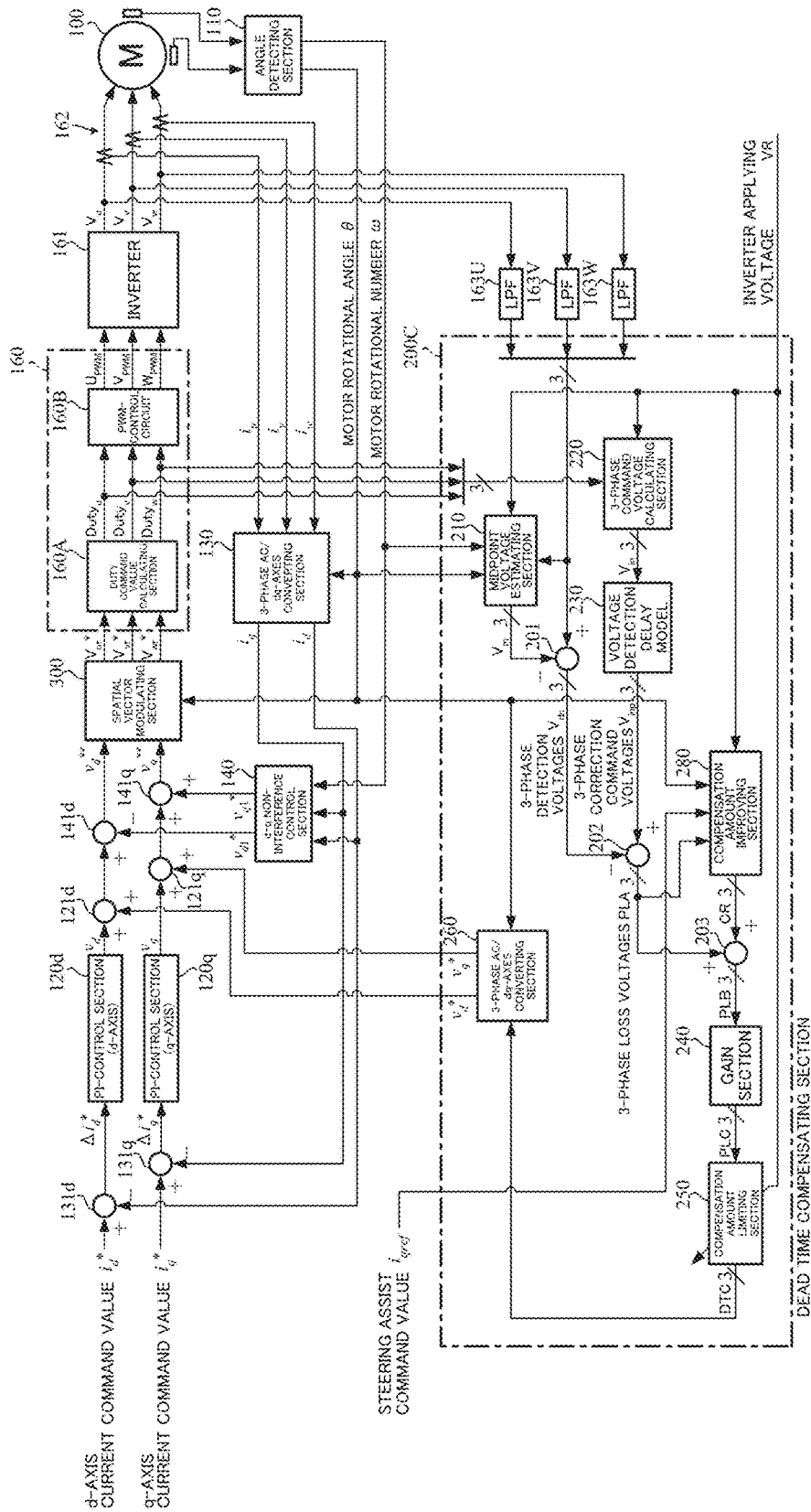
FIG. 25 is a block diagram showing a configuration example (the fourth embodiment) of the present invention.

FIG. 25 shows a whole configuration example of the fourth embodiment of the present invention corresponding to FIG. 5, and there is provided a dead time compensating section 200C to calculate the dead time compensation values vd* and vq* on the dq-axes. In comparison with the dead time compensating section 200 of the first embodiment, the dead time compensating section 200C newly includes a compensation amount improving section 280 and other configurations are same. The motor rotational angle θ, the inverter applying voltage VR, the q-axis steering assist command value iqref corresponding to the steering assist command value Iref2 and 3-phase loss voltages PLA are inputted into the compensation amount improving section 280.

Figure 26:
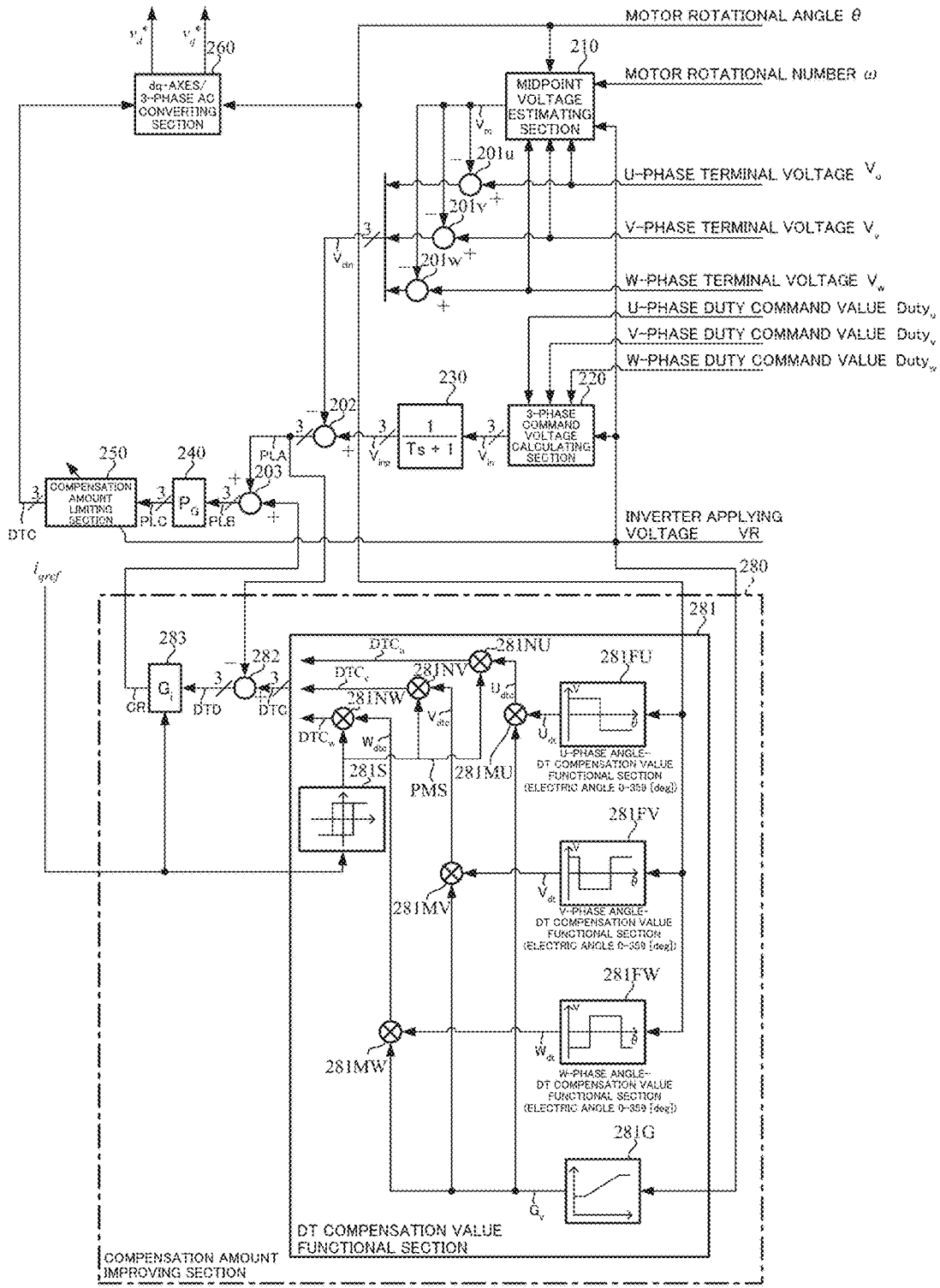
FIG. 26 is a block diagram in details showing a configuration example a dead time compensating section according to the fourth embodiment.

The detail configuration of the dead time compensating section 200C is shown in FIG. 26, and the midpoint voltage estimating section 210 is shown in FIG. 7. The midpoint voltage estimating section 210 estimates the midpoint voltage estimation value Vm as described above, and the midpoint voltage estimation value Vm is inputted into the subtracting section 201. The differences between the midpoint voltage estimation value Vm and the motor terminal voltages are obtained in the subtracting section 201, and the differences are inputted into the subtracting section 202. Further, the 3-phase command voltage calculating section 220 and the voltage detection delay model 230 are also same with the first embodiment, the 3-phase correction command voltages Vinp from the voltage detection delay model 230 are addition-inputted into the subtracting section 202, and the deviations for the 3-phase detection voltages Vdn are inputted into the compensation amount improving section 280 and the adding section 203 as the 3-phase loss voltages PLA.

The configuration of the compensation amount improving section 280 is shown in FIG. 26, the compensation amount improving section 280 comprises a dead time compensation value functional section 281 to input the steering assist command value iqref, the motor rotational angle θ and the inverter applying voltage VR, a subtracting section to obtain dead time compensation values DTD which are deviations between the correction dead time compensation values DTC from the dead time compensation value functional section 281 and the 3-phase loss voltages PLA from the subtracting section 202, and a gain section to output the compensation amount CR by multiplying the dead time compensation values DTD with a current gain Gi sensitive to the steering assist command value iqref.

Figure 27:
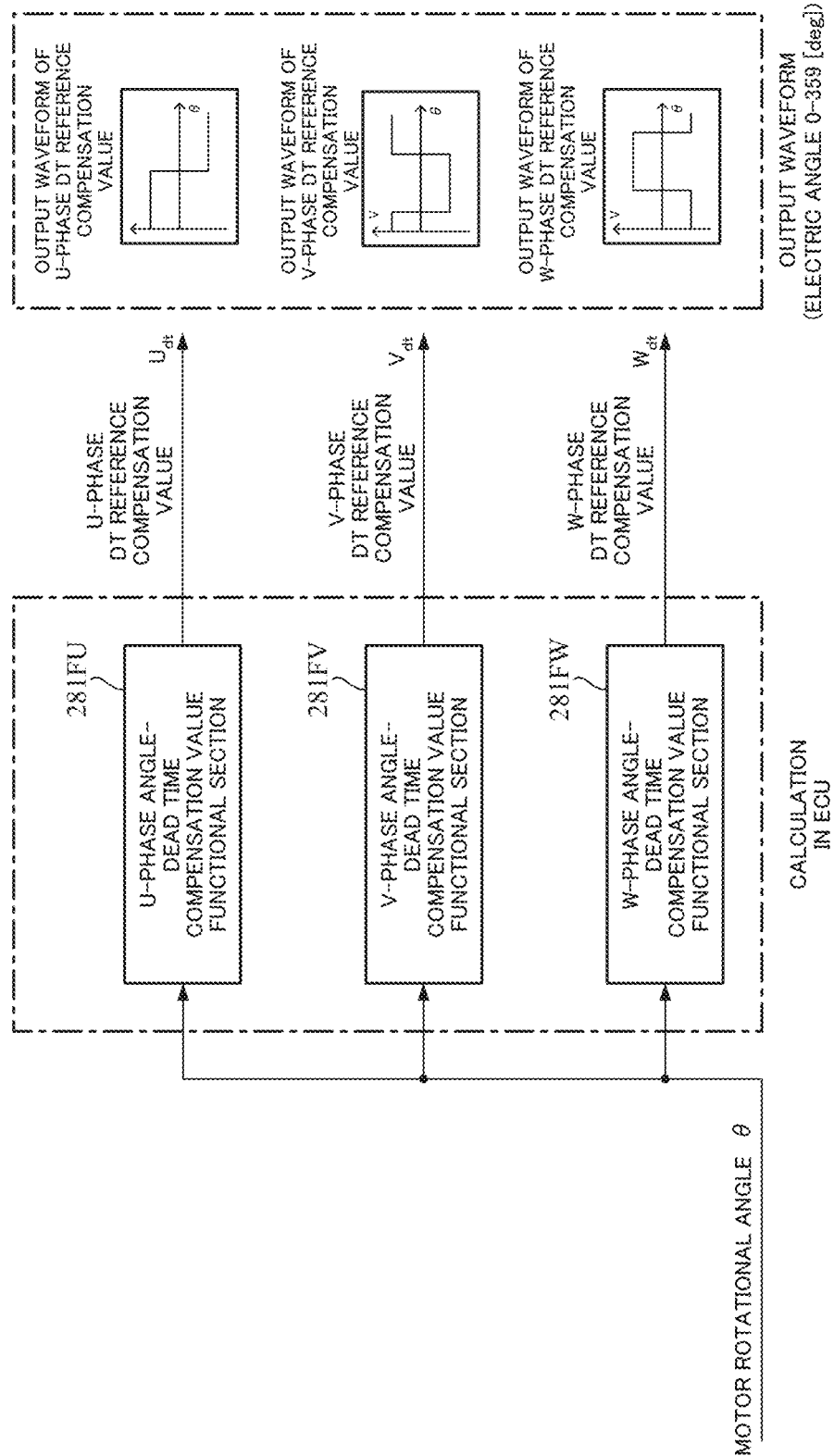
FIG. 27 is a diagram showing an operation example of the each-phase angle-dead time compensation value functional section.

As detail configuration is shown in FIG. 27, the dead time compensation value functional section 281 includes a U-phase angle-dead time compensation value functional section 281FU, a V-phase angle-dead time compensation value functional section 281FV, a W-phase angle-dead time compensation value functional section 281FW that respectively output rectangular wave 3-phase dead time reference compensation values Udt, Vdt, Wdt of which phases are sifted each other by 120 [deg] in a scope of 0 to 369 [deg] for the motor rotational angle θ. Further, the dead time compensation value functional section 281 includes an inverter applying voltage-sensitive gain calculating section 281G to output a voltage-sensitive gain Gv sensitive to the inverter applying voltage VR, multiplying sections 281MU, 281MV, 281MW to output 3-phase dead time compensation values Udtc (=Gv·Udt), Vdtc (=Gv·Vdt), Wdtc (=Gv·Wdt) by respectively multiplying the 3-phase dead time reference compensation values Udt, Vdt, Wdt with the voltage-sensitive gain Gv, and a compensation sign judging section 281S to output a sign PMS for the compensation by judging a positive sign or a negative sign of the steering assist command value iqref.

Figure 28:
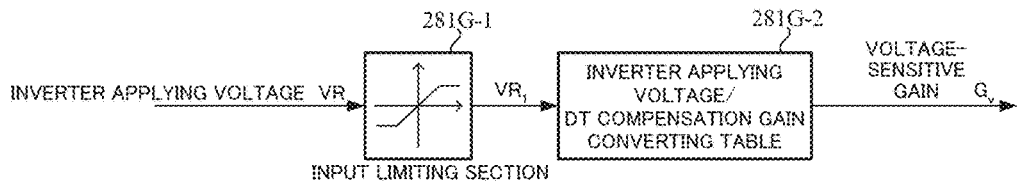
FIG. 28 is a block diagram showing a configuration example of the inverter applying voltage-sensitive gain section.
Figure 29:
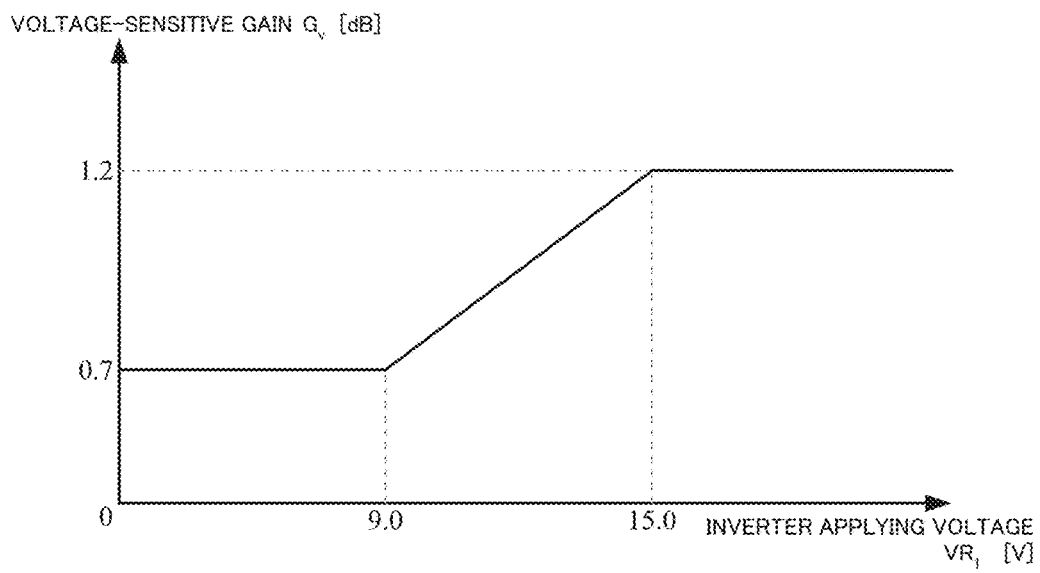
FIG. 29 is a characteristic chart showing a characteristic example of the inverter applying voltage-sensitive gain section.

The angle-dead time compensation value functional section 281FU, 281V, 281W convert the dead time compensation values needed on 3-phases into functions due to the angle and output the dead time reference compensation values Udt, Vdt, Wdt by a calculation on the real time of the ECU. The angle functions of the dead time reference compensation values are depending on the dead time characteristic of the ECU. Further, since the optimum dead time compensation amount varies depending on the inverter applying voltage VR, the present embodiment calculates the dead time compensation amount depending on the inverter applying voltage VR and changes the compensation amount. The configuration of the inverter applying voltage-sensitive gain calculating section 281G to output the voltage-sensitive Gv by inputting the inverter applying voltage VR is shown in FIG. 28, and the inverter applying voltage VR is limited the plus/minus maximum value in an input limiting section 281G-1 and the limited inverter applying voltage VR1 is inputted into an inverter applying voltage/dead time compensation gain converting table 281G-2. The characteristic of the inverter applying voltage/dead time compensation gain converting table 281G-2 is shown, for example, in FIG. 29. The inverter applying voltages 9.0[V] and 15.0[V] of inflection points and the voltage-sensitive gains "0.7" and "1.2" are examples and are appropriately changeable.

The dead time compensation values Udtc (=Gv·Udt), Vdtc (=Gv·Vdt), Wdtc (=Gv·Wdt) multiplied with the voltage-sensitive gain Gv are respectively inputted into the subtracting sections 281NU, 281NV, 281NW. Further, the steering assist command value iqref is inputted into the compensation sign judging section 281S, and judged sign PMS is inputted into the multiplying sections 281NU, 281NV, 281NW. The correction dead time reference compensation values DTC (Udt, Vdt, Wdt) are calculated by multiplying the dead time compensation values Udtc, Vdtc, Wdtc with the sign PMS.

The correction dead time reference compensation values DTC (Udt, Vdt, Wdt) calculated in the dead time compensation value functional section 281 are addition-inputted into the subtracting section 282, and the respective phase loss voltages PLA from the subtracting section 202 are subtraction-inputted into the subtracting section 282. The dead time compensation values DTD being the deviations are calculated in the subtracting section 282. The dead time compensation values DTD is inputted into the gain section 283, and the dead time compensation amount CR is outputted by multiplying the dead time compensation values DTD with the current gain Gi sensitive to the steering assist command value iqref.

Figure 30:
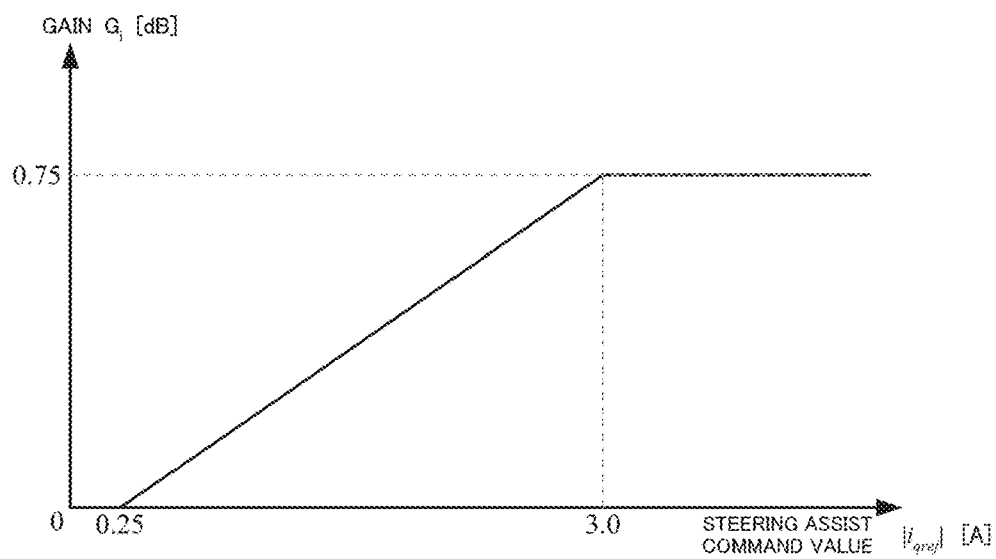
FIG. 30 is a characteristic chart showing a characteristic example of the steering assist command value-sensitive gain section.

The characteristic of the gain section 283 is shown in FIG. 30 for the steering assist command value iqref, and the dead time compensation amount CR multiplied with the current command Gi is inputted into the adding section 203 and is added with the 3-phase loss voltages PLA. The corrected 3-phase loss voltages PLB (Vloss_n) being the addition result are multiplied with the gain $P_G$ at the gain section 240 as described above, and the 3-phase loss voltages PLB multiplied with the gain $P_G$ are inputted into the compensation amount limiting section 250.

An input signal relating to a sensitive operation of the current gain Gi is only the steering assist command value iqref (or the absolute value |iqref|). In a minute current region near zero-cross where the sign of the steering assist command value iqref changes, it had better not correct by using the differences for the ideal and a high accuracy is obtained (the error correction is easy occurred due to the chattering of the steering assist command value iqref). In this connection, as shown in FIG. 30, the current gain Gi is held with "0" till a predetermined current value (e.g. 0.25 [A]), gradually increases till a predetermined current value (e.g. 0.75 [A]) for the current exceeding the predetermined current value (e.g. 0.25 [A]), and is held with a constant (e.g. 0.75) in a case that the steering assist command value iqref exceeds the predetermined current value (e.g. 3.0 [A]).

The compensation amount limiting section 250 is sensitive to the inverter applying voltage VR, and outputs the dead time compensation values DTC based on the judgement of the above Equations 8 and 9 as shown in FIG. 9. The dead time compensation values DTC are inputted into the 3-phase AC/dq-axes converting section 260, and converted into the dead time compensation values vd* and vq* of 2-phases in synchronous with the motor rotational angle θ.

As described above, the present embodiment estimates the 3-phase voltages by detecting the 3-phase terminal voltages, calculates the 3-phase command voltages from the 3-phase duty command values, further 3-phase correction command voltages, calculates the loss voltages due to the dead time of the inverter from the differences therebetween, and corrects by using the dead time compensation amount CR. From the calculated loss voltages, in a case that the compensation amount exceeding the upper-limit, the present embodiment judges the disturbance due to the back-EMF or the like and calculates the loss due to the dead time by limiting the compensation values. Further, it is possible to compensate the dead time even on the dq-axes by converting the calculated loss voltages into the dq-axes and feeding back to the dq-axes as the compensation values.

Here, the waveform examples of the parts of the compensation amount improving section 280 are shown in FIGS. 31A to 31D, and they show that a waveform near an ideal dead time compensation waveform is obtained by the correction and the torque ripple of the steering maneuver is reduced. That is, FIG. 31A shows a waveform of the U-phase loss voltage PLA, and the deviation between FIG. 31A and FIG. 31B showing an ideal dead U-phase time compensation value DTC is a waveform (the dead time compensation value DTD) as shown in FIG. 31C. It is possible to obtain the dead time compensation waveform near the ideal waveform as shown in FIG. 31D by multiplying the dead time compensation values DTD with the current gain Gi sensitive to the steering assist command value iqref and then adding to the loss voltage. As well, although FIG. 31 shows only the U-phase, other phases (V-phase and W-phase) are same.

Figure 32:
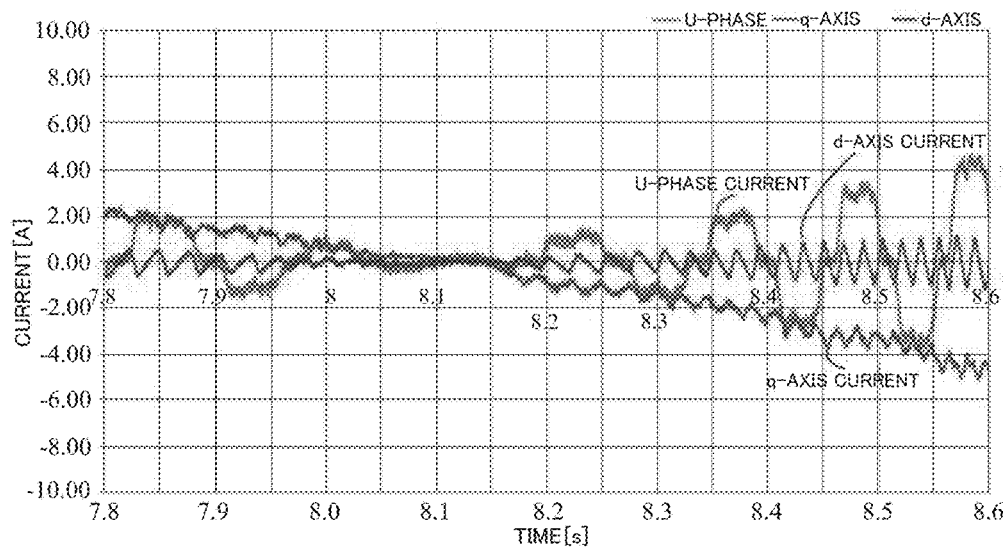
FIG. 32 is a waveform chart showing an effect of the present invention (the fourth embodiment)
Figure 33:
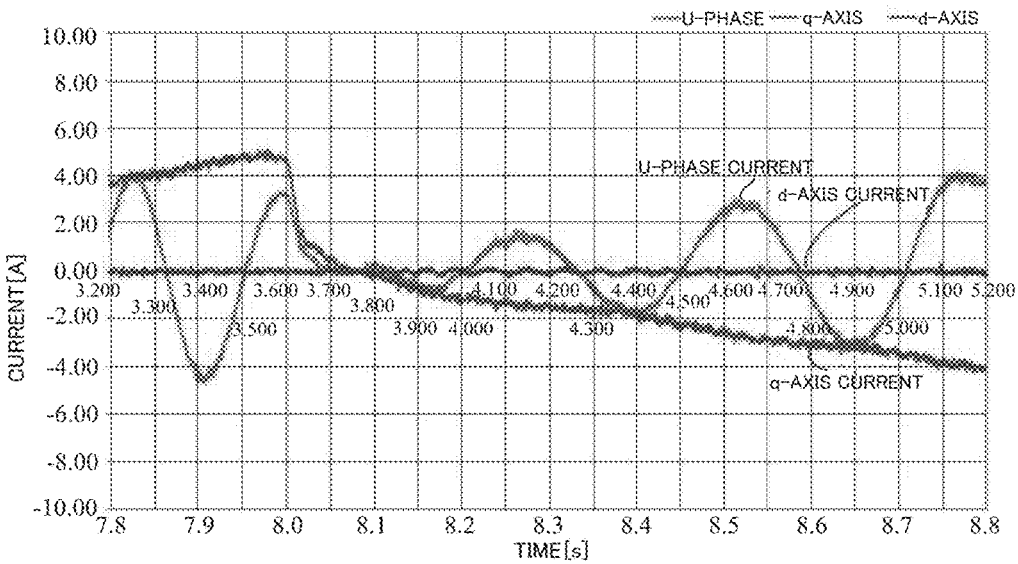
FIG. 33 is a waveform chart showing an effect of the present invention (the fourth embodiment)
Figure 34:
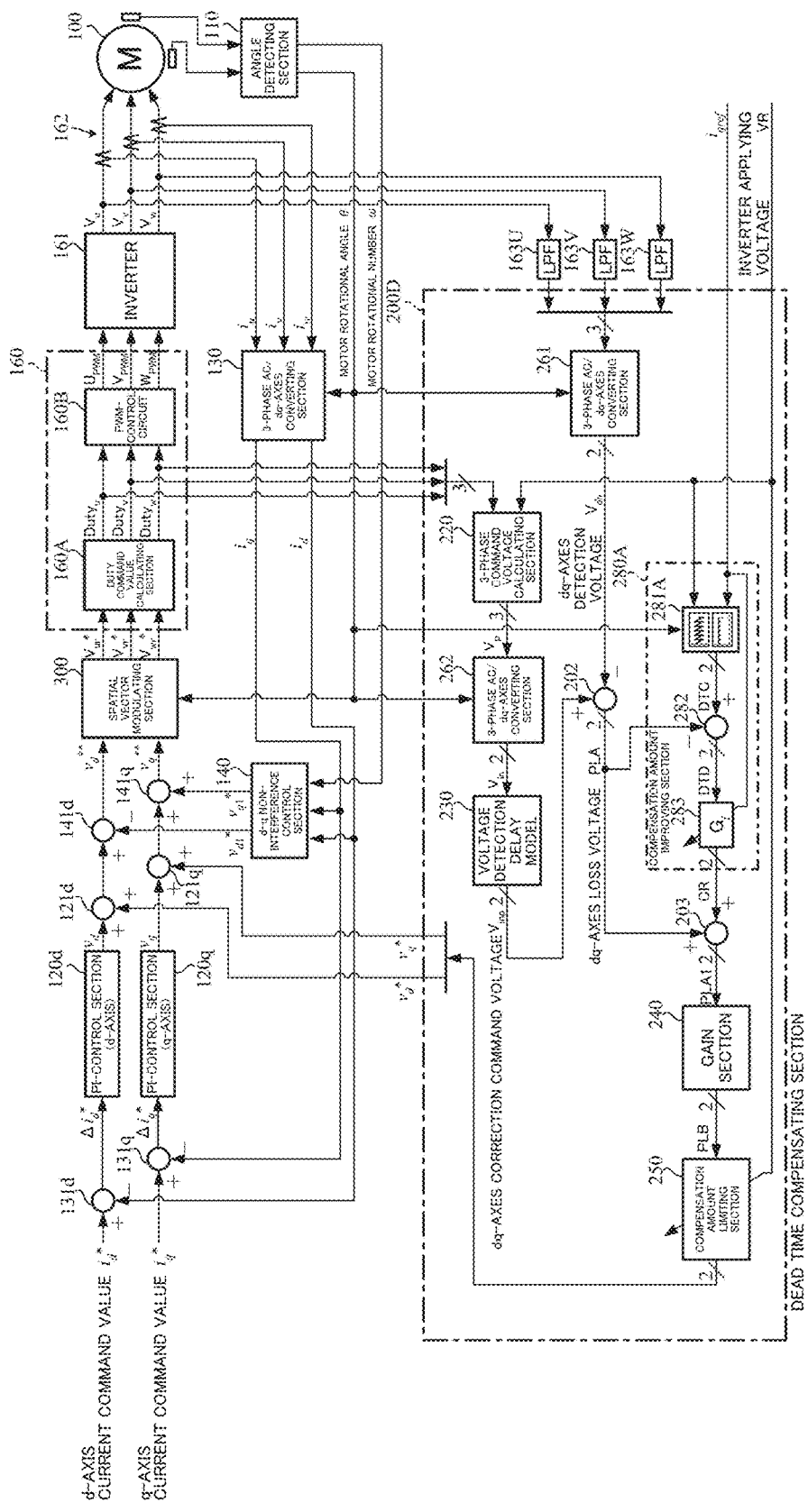
FIG. 34 is a block diagram showing a configuration example (the fifth embodiment) of the present invention.

FIG. 32 and FIG. 33 are test results to show the advantageous effects of the fourth embodiment by using a test apparatus simulated an actual vehicle regarding the U-phase, and FIG. 32 indicates the U-phase current, the d-axis current and the q-axis current without the dead time compensation. By applying the dead time compensation of the present embodiment, it is confirmed that the improvement (ripple of the dq-axes current waveform is little, the current waveform is near a sine-wave) of the wave distortions of the phase currents and the dq-axes currents appears in the low load and the low speed steering maneuver as shown in FIG. 33. The improvement of the torque ripple in the steering maneuver and the improvement of the steering sound appeared.

Next, the fifth embodiment of the present invention will be described.

As described above, the second embodiment detects the dq-axes detection voltages by detecting the 3-phase terminal voltages, calculates the dq-axes command voltages from the 3-phase duty command values, further calculates the dq-axes correction command voltages, and calculates the loss voltages due to the dead time of the inverter from the differences between the dq-axes correction command voltages and the dq-axes detection voltages. From the calculated loss voltages, in a case that the compensation amount exceeding the upper-limit, the second embodiment judges the disturbance due to the back-EMF or the like and calculates the loss due to the dead time by limiting the compensation values. Further, the calculated loss voltages are fed back as the compensation values and the dead time compensation is performed on the dq-axes.

Figure 1:
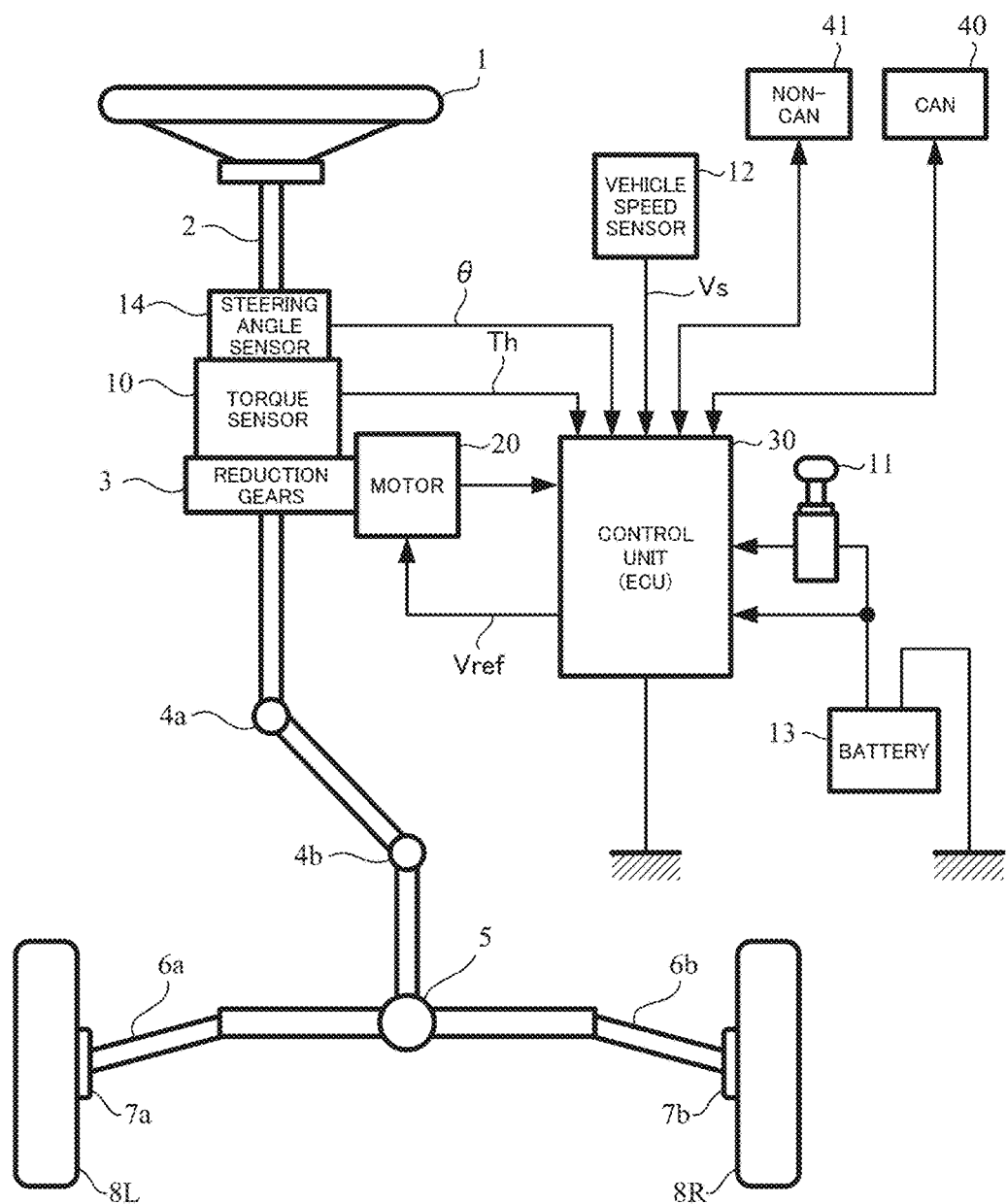
FIG. 1 is a configuration diagram showing a general outline of an electric power steering apparatus.
Figure 2:
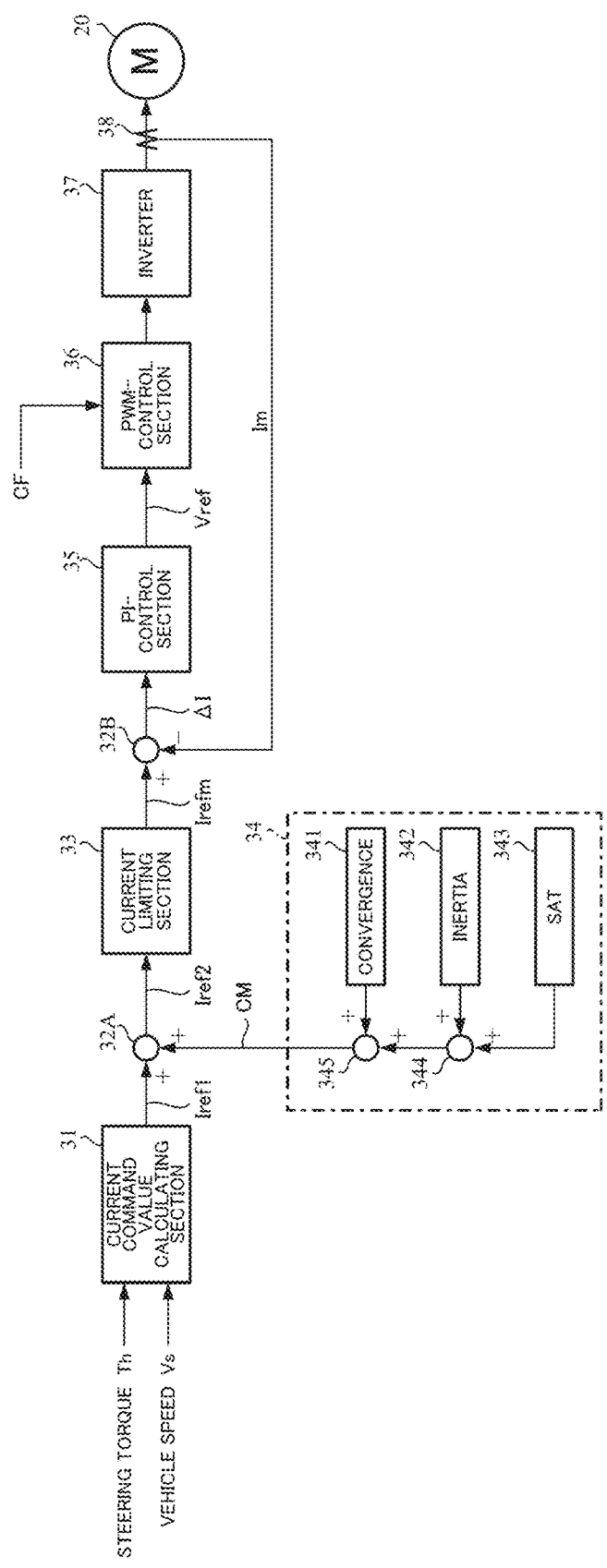
FIG. 2 is a block diagram showing a configuration example of a control unit (ECU) of the electric power steering apparatus.

However, according to the second embodiment, the dead time compensation amount is a little less than the ideal dead time compensation amount due to the delay from the detection of the loss voltage by the dead time to the reflection. Thus, the fifth embodiment modifies the compensation amount improving section 280 of the fifth embodiment to 2-phases and adds the modified compensation amount improving section 280A to the configuration of FIG. 18. That is, the compensation amount improving section 280A of the fifth embodiment comprises a dq-axes dead time compensation ideal model 281A to output an ideal dead time compensation values DTC based on the q-axis steering assist command value iqref corresponding to the steering assist command value Iref2 of FIG. 2, a subtracting section 282 to calculate the deviations DTD between the dead time compensation values DTC and the dq-axes loss voltages PLA, and a gain section 283 to multiply the deviation DTD by the current gain Gi based on the steering assist command value iqref. The improvement compensation amount CR from the gain section 283 is added with the dq-axes loss voltages PLA in the adding section 203 and is return-corrected, and the corrected compensation amount PLA1 is inputted into the gain section 240.

Figure 35:
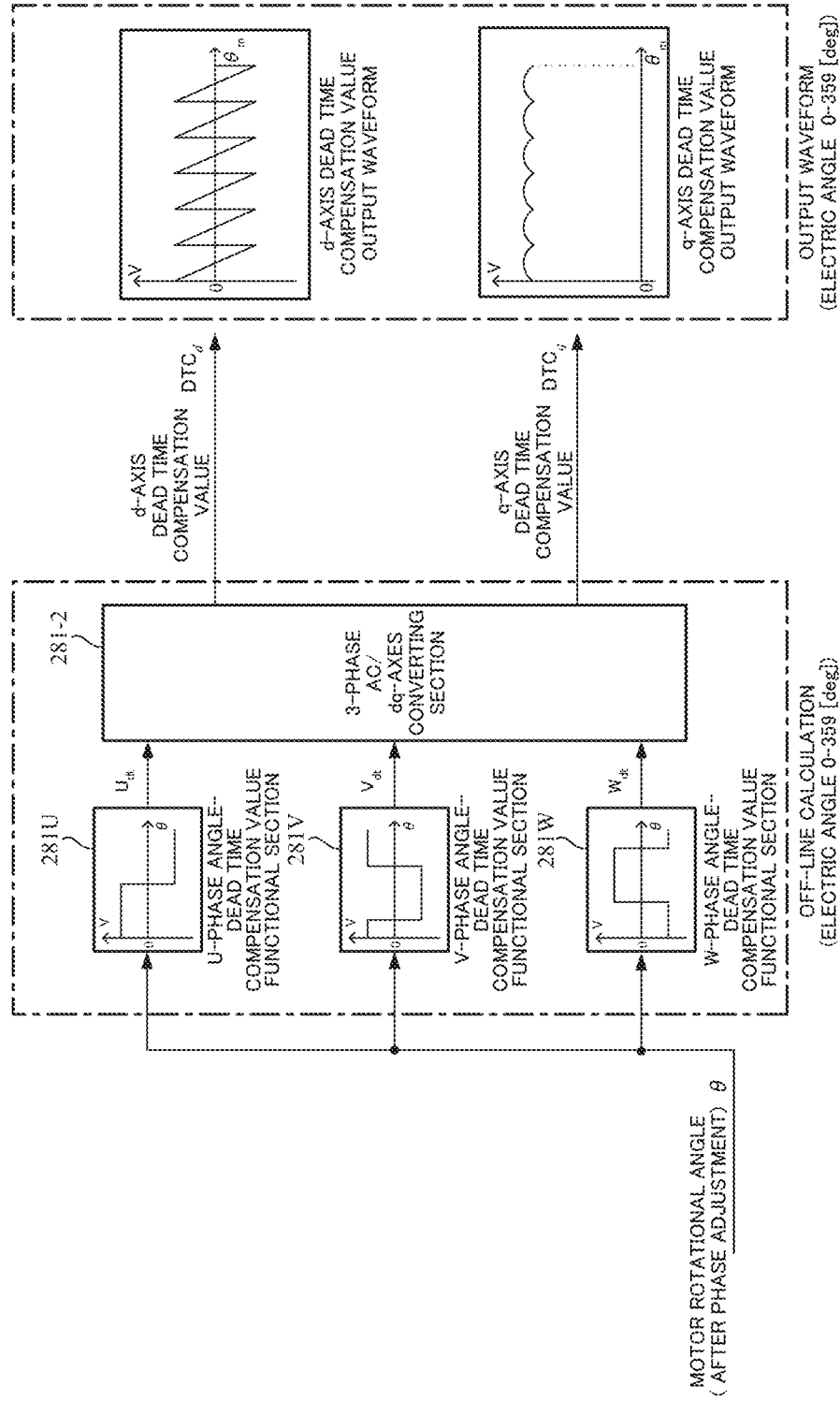
FIG. 35 is a diagram showing an operation example of the 3-phase angle-dead time compensation value functional section.
Figure 36A:
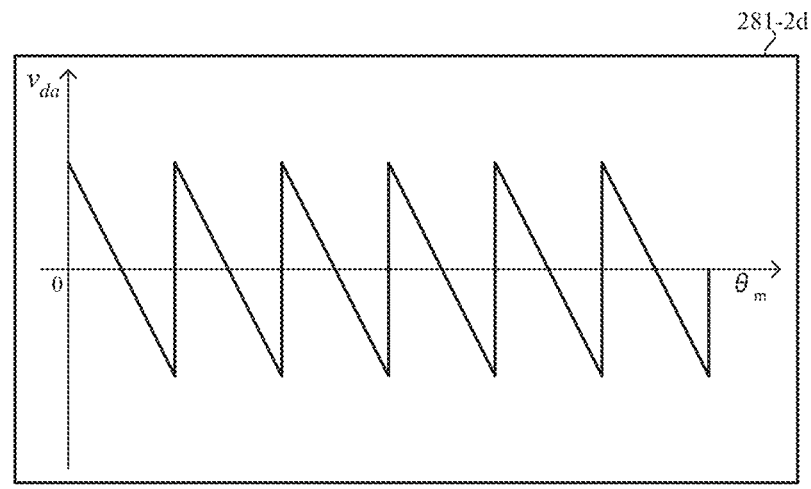
FIGS. 36A and 36B are characteristic charts showing an output voltage characteristic example of the dq-axes angle-dead time compensation value reference table.
Figure 36B:
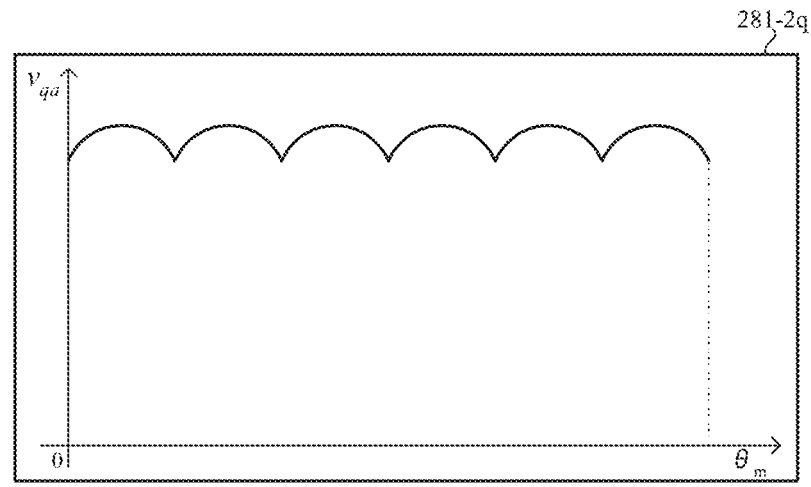

The dq-axes dead time compensation ideal model 281A uses a function to output the dead time compensation value due to the angle, and is converted into the dead time compensation values DTd, DTq of the output waveform as shown in FIG. 35. The angle-dead time (DT) compensation value reference tables 281-2d and 281-2q due to the motor rotational angle (θ)-input are generated based on the dq-axes output waveform of FIG. 35. The angle-dead time (DT) compensation value reference tables 281-2d has an output voltage characteristic (the d-axis dead time reference compensation value) of sawtooth wave shape against the motor rotational angle θ (the motor rotational angle θ after the phase adjustment) as shown in FIG. 36A, and the angle-dead time (DT) compensation value reference tables 281-2q has an output voltage characteristic (the q-axis dead time reference compensation value) of wavy wave shifted by an offset voltage as shown in FIG. 36B.

The dead time compensation values DTC from the dq-axes dead time compensation ideal model 281A are inputted into the subtracting section 282, and the deviations between the dead time compensation values DTC and the dq-axes loss voltages PLA are calculated. The deviations DTD are inputted into the gain section 283, and the dead time compensation amount CR multiplied by the gain Gi as a parameter of the steering assist command value iqref is outputted with the characteristic shown in FIG. 30. The characteristic of the gain section 283 is same with the fourth embodiment. That is, in a minute current region near zero-cross where the sign of the steering assist command value iqref changes, it had better not correct by using the differences for the ideal and a high accuracy is obtained. Consequently, as shown in FIG. 30, the current gain Gi is held with "0" till a predetermined current value, gradually increases till a predetermined upper-current value, and is held with a constant in a case that the steering assist command value iqref exceeds the upper-current value. Subsequent operations are the same with FIG. 22.

Figure 37:
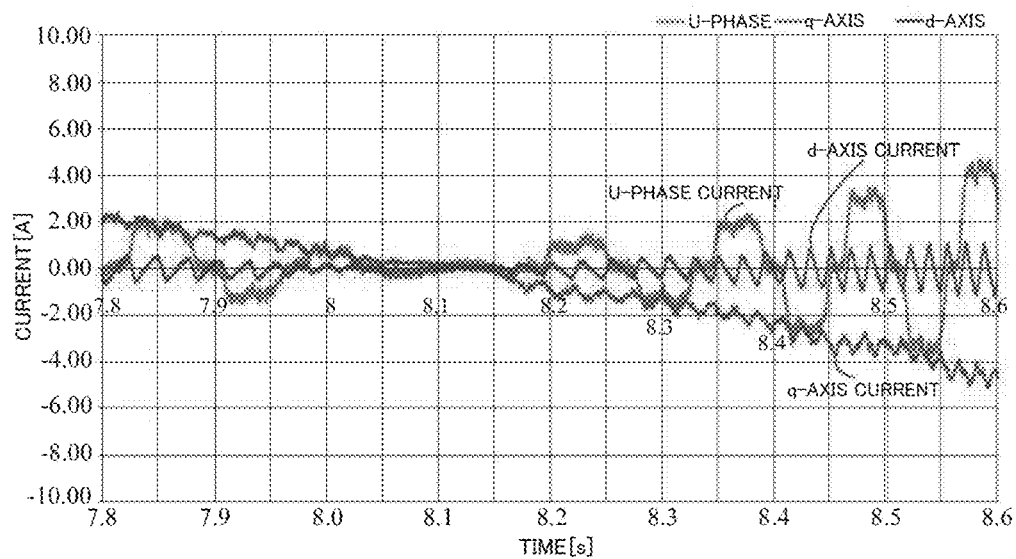
FIG. 37 is a waveform chart showing an effect of the present invention (the fifth embodiment)
Figure 38:
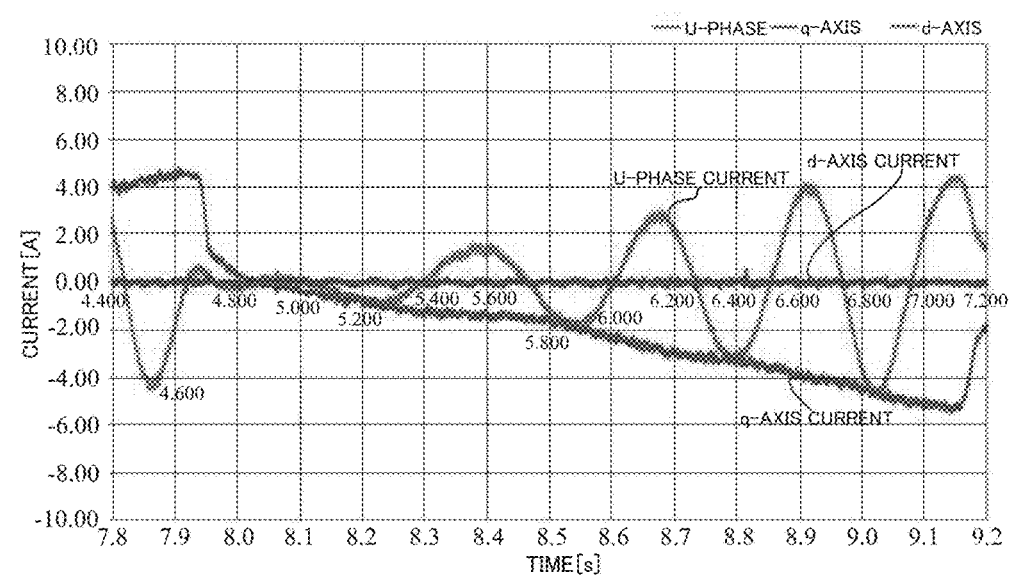
FIG. 38 is a waveform chart showing an effect of the present invention (the fifth embodiment)

FIG. 37 and FIG. 38 are test results to show the advantageous effects of the fourth embodiment by using a test apparatus simulated an actual vehicle regarding the U-phase, and FIG. 37 indicates the U-phase current, the d-axis current and the q-axis current without the dead time compensation. By applying the dead time compensation of the present embodiment, it is confirmed that the improvement (ripple of the dq-axes current waveform is little, the current waveform is near a sine-wave) of the wave distortions of the phase currents and the dq-axes currents appears in the low load and the low speed steering maneuver as shown in FIG. 38. The improvement of the torque ripple in the steering maneuver and the improvement of the steering sound appeared.

Figure 39:
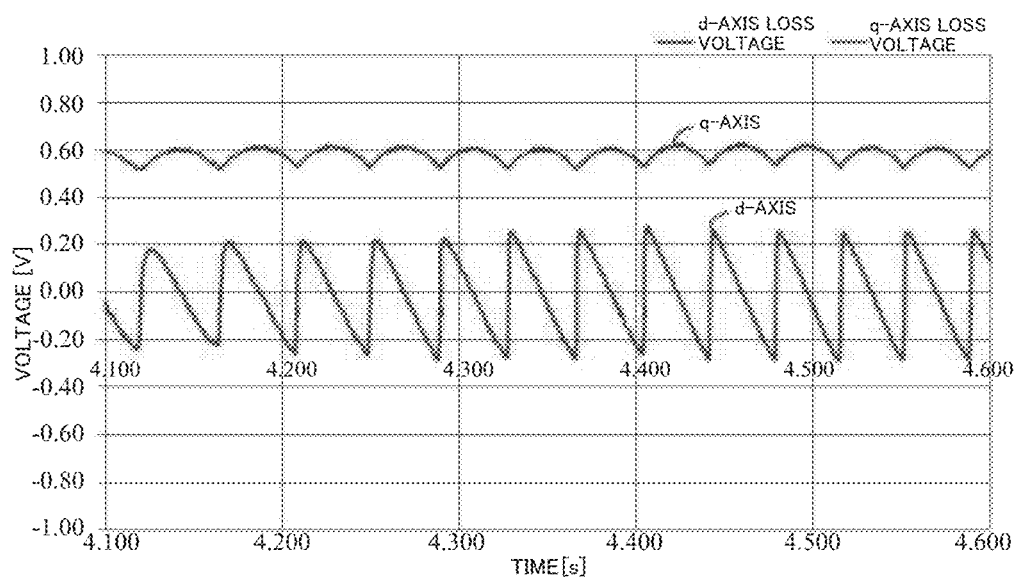
FIG. 39 is a partial waveform chart showing an effect of the compensation amount improving section according to the present invention.
Figure 40:
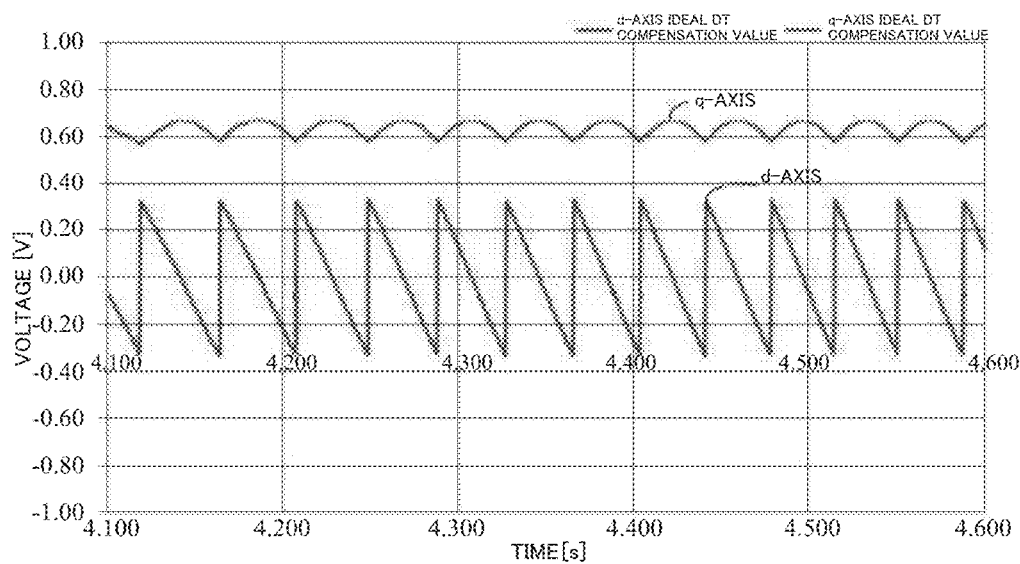
FIG. 40 is a partial waveform chart showing an effect of the compensation amount improving section according to the fifth embodiment.
Figure 41:
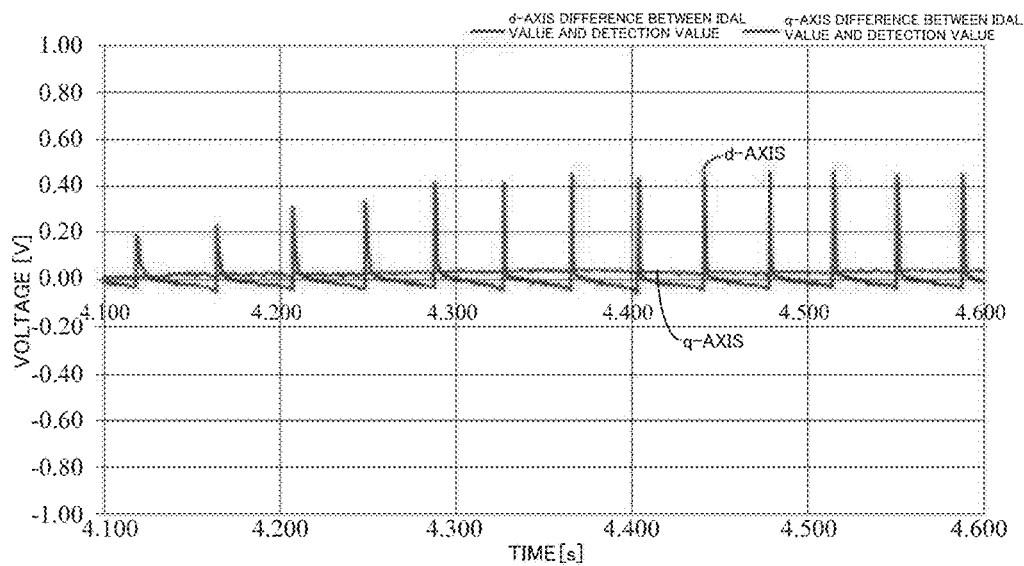
FIG. 41 is a partial waveform chart showing an effect of the compensation amount improving section according to the fifth embodiment.
Figure 42:
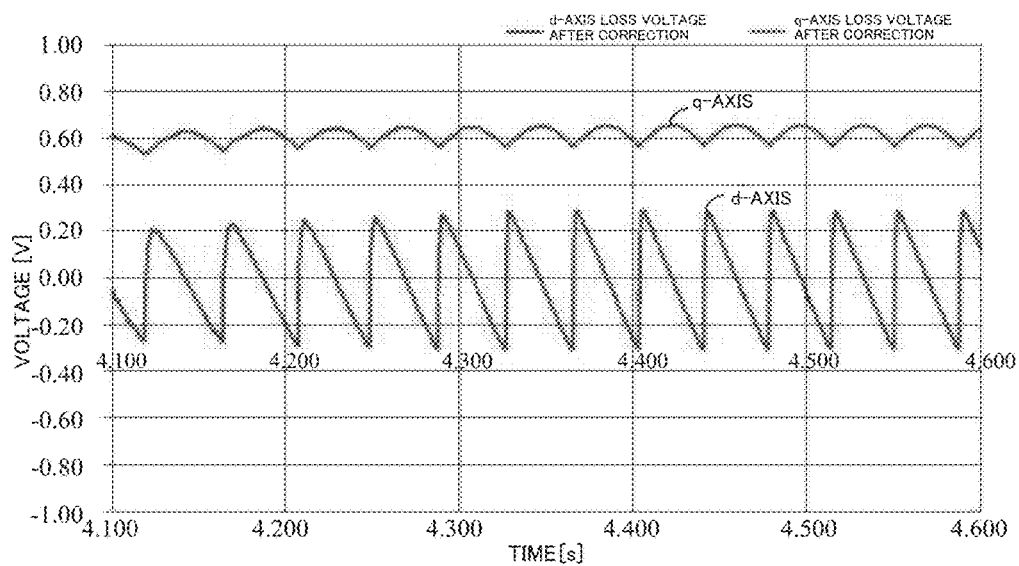
FIG. 42 is a waveform chart showing an effect of the present invention (the fifth embodiment)
Figure 43:
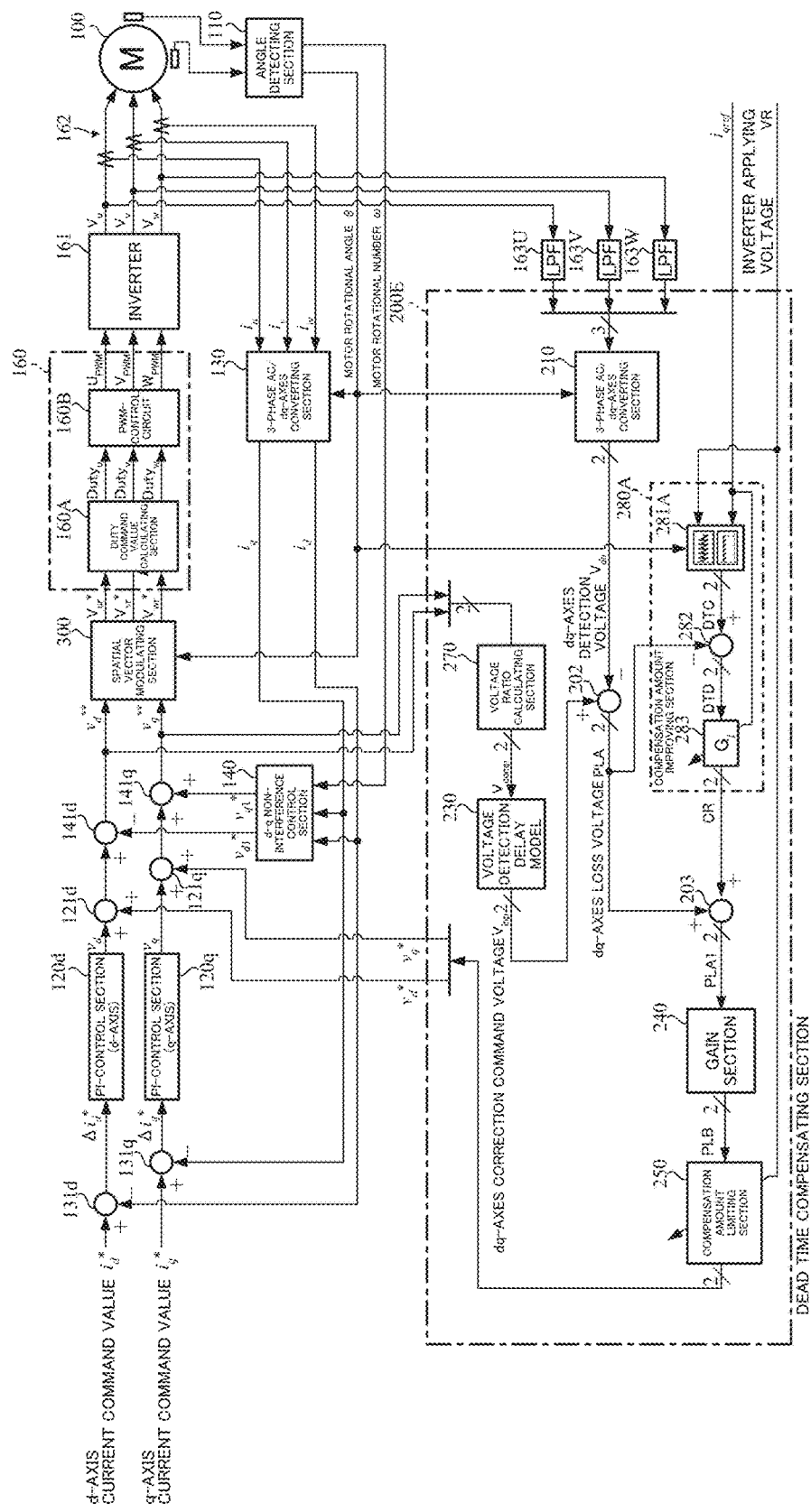
FIG. 43 is a block diagram showing a configuration example (the sixth embodiment) of the present invention.

Further, the waveform examples of the parts of the compensation amount improving section 280A are shown in FIG. 39 to FIG. 42. FIG. 39 shows a waveform of the U-phase loss voltage PLA, and FIG. 40 shows the dead time compensation value DTC outputted from the dq-axes dead time compensation ideal model 281A. FIG. 41 is a waveform example of the deviation calculated at the subtracting section 282, and FIG. 42 is a waveform example of the dead time compensation amount PLA1 corrected at the adding section 203. From these waveform diagrams, in comparison with the waveform of FIG. 39, it is understood that the waveform of FIG. 42 after the correction is corrected to the waveform near the ideal dead time compensation waveform.

Next, the sixth embodiment will be described.

As described above, the third embodiment detects the dq-axes detection voltages Vdn by detecting the motor terminal voltages, calculates the dq-axes correction command voltages Vind, Vinq from the dq-axes voltage command values vd, vq, and calculates the loss voltages PLA due to the dead time of the inverter from the differences between the dq-axes correction command voltages Vind, Vinq and the dq-axes detection voltages Vdd, Vdq. From the calculated loss voltages, in a case that the compensation amount exceeding the upper-limit, the third embodiment judges the disturbance due to the back-EMF or the like and calculates the loss due to the dead time by limiting the compensation values. Further, it is possible to compensate the dead time even on the dq-axes by converting the calculated loss voltages into the dq-axes and feeding back to the dq-axes as the compensation values.

However, according to the third embodiment, the dead time compensation amount is a little less than the ideal dead time compensation amount due to the delay from the detection of the loss voltage by the dead time to the reflection. Thus, the sixth embodiment modifies the compensation amount improving section 280 of the fourth embodiment to 2-phase, that is, the compensation amount improving section 280 explained in the fifth embodiment and adds the compensation amount improving section 280A to the configuration of FIG. 22.

The operations and the configuration of the compensation amount improving section 280A are entirely same with that of fifth embodiment, the dead time compensation values DTC from the dq-axes dead time compensation ideal model 281A are inputted into the subtracting section 282, and the deviations DTD (=DTC-PLA) between the dead time compensation values DTC and the dq-axes loss voltages PLA are calculated. The deviations DTD are inputted into the gain section 283, and the dead time compensation amount CR multiplied by the gain Gi as a parameter of the steering assist command value iqref is outputted with the characteristic shown in FIG. 30. Subsequent operations are the same with FIG. 22. In a minute current region near zero-cross where the sign of the steering assist command value iqref changes, it had better not correct by using the differences for the ideal and a high accuracy is obtained. Consequently, as shown in FIG. 30, the current gain Gi is held with "0" till a predetermined current value, gradually increases till a predetermined upper-current value, and is held with a constant in a case that the steering assist command value iqref exceeds the upper-current value.

Figure 44:
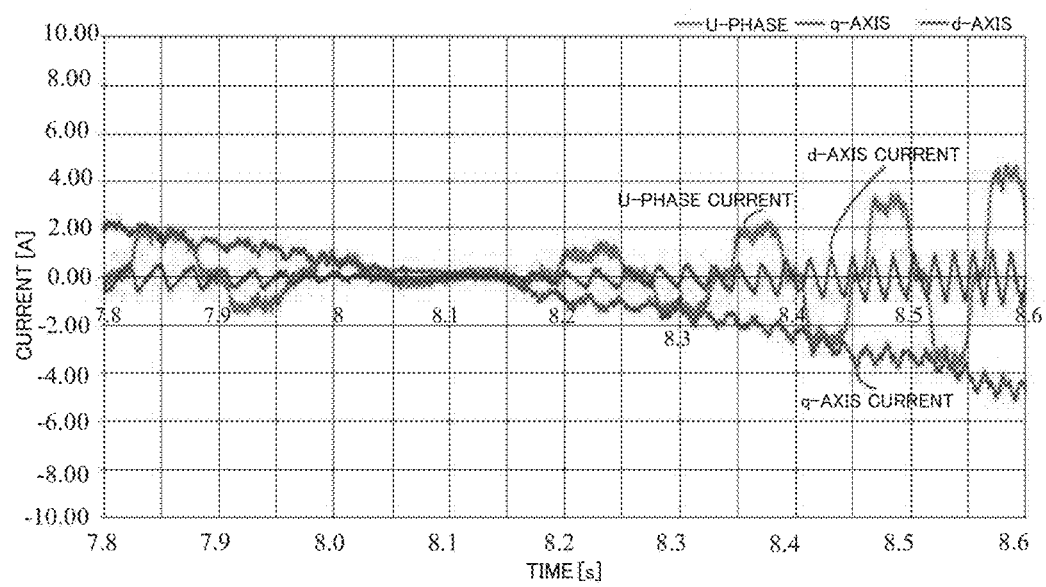
FIG. 44 is a waveform chart showing an effect of the present invention (the sixth embodiment)
Figure 45:
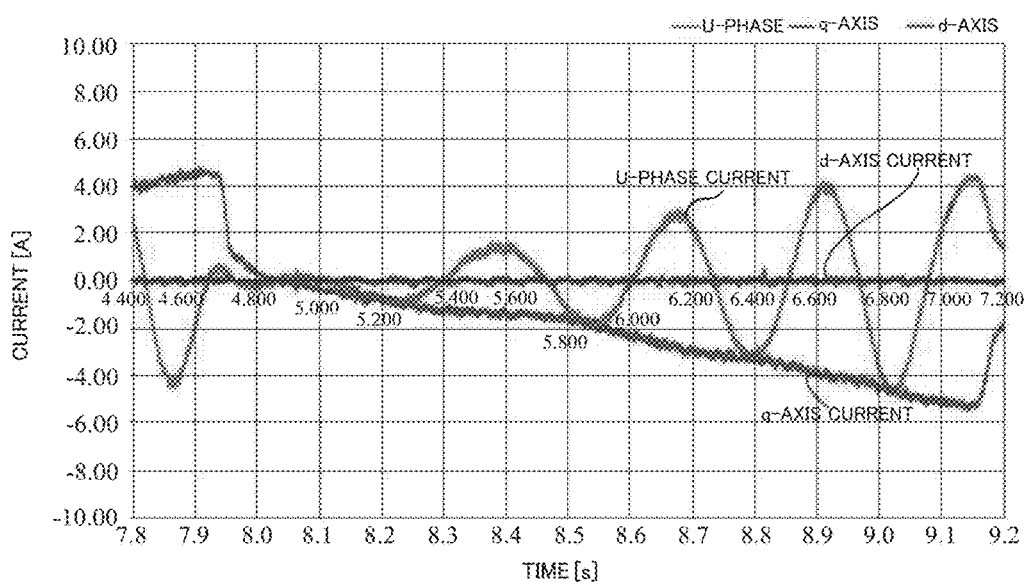
FIG. 45 is a waveform chart showing an effect of the present invention (the sixth embodiment).

FIG. 44 and FIG. 45 are test results to show the advantageous effects of the fourth embodiment by using a test apparatus simulated an actual vehicle regarding the U-phase, and FIG. 37 indicates the U-phase current, the d-axis current and the q-axis current without the dead time compensation. By applying the dead time compensation of the present embodiment, it is confirmed that the improvement (ripple of the dq-axes current waveform is little, the current waveform is near a sine-wave) of the wave distortions of the phase currents and the dq-axes currents appears in the low load and the low speed steering maneuver as shown in FIG. 45. The improvement of the torque ripple in the steering maneuver and the improvement of the steering sound appeared.

EXPLANATION OF REFERENCE NUMERALS 1 handle
2 column shaft (steering shaft, handle shaft)
20, 100, motor
30 control unit (ECU)
31 current command value calculating section
35,203, 204 PI-control section
36, 160 PWM-control section
37, 161 inverter
110 angle detecting section
130 3-phase AC/dq-axes converting section
140 d-q non-interference control section
200, 200A, 200B, 200C, 200D, 200E dead time compensating section
210 midpoint voltage estimating section
220 3-phase command voltage calculating section
230 voltage detection delay model
240, 283 gain section
250 compensation amount limiting section
260, 261, 262 3-phase AC/dq-axes converting section
270 voltage ratio correction calculating section
280, 280A compensation amount improving section
281 dead time compensation value functional section
281A dq-axis dead time compensation ideal model
300 spatial vector modulating section
301 2-phase/3-phase converting section
302 third harmonic wave superposition section

The invention claimed is:
1. An electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle,
wherein 3-phase detection voltages are estimated based on 3-phase motor terminal voltages, loss voltages due to a dead time of said inverter are estimated from differences between 3-phase correction command voltages calculated from said 3-phase duty command values and said 3-phase detection voltages, and a dead time compensation of said inverter is performed by feeding back dead time compensation values obtained by compensating said loss voltages to said dq-axes current command values.

2. The electric power steering apparatus according to claim 1,
wherein further including a function that limits a maximum upper-limit of a compensation amount of said dead time compensation values with an inverter applying voltage and extracts loss voltages due to a dead time from a disturbance such as a back-EMF, and
wherein phases of said loss voltages are adjusted to said 3-phase detection voltages by modeling a circuit to detect said 3-phase detection voltages and by adding to 3-phase command voltages as a voltage detection delay model.

3. An electric power steering apparatus of a vector control system that converts dq-axes current command values calculated based on at least a steering torque into 3-phase duty command values, driving-controls a 3-phase brushless motor by an inverter of a pulse width modulation (PWM) control, and applies an assist torque to a steering system of a vehicle, comprising:
a midpoint voltage estimating section that estimates midpoint voltages based on 3-phase motor terminal voltages, a motor rotational angle, a motor rotational number and an inverter applying voltage;
a 3-phase detection voltage calculating section that calculates 3-phase detection voltages from said midpoint voltages and said 3-phase motor terminal voltages;

a 3-phase command voltage calculating section that calculates 3-phase command voltages based on said 3-phase duty command values and said inverter applying voltage;

a 3-phase loss voltage calculating section that estimates 3-phase loss voltages due to a dead time of said inverter from differences between said 3-phase detection voltages and said 3-phase command voltages; and a dead time compensation output section that calculates dq-axes dead time compensation values from said 3-phase loss voltages calculated in said 3-phase loss voltage calculating section with a sensitivity to said inverter applying voltage and in synchronous with said motor rotational angle;

wherein a dead time compensation of said inverter is performed by feeding back said dq-axes dead time compensation values to said dq-axes current command values.

4. The electric power steering apparatus according to claim 3, wherein a voltage detection delay model to improve phase differences is disposed on a rear stage of said 3-phase command voltage calculating section, and said differences are calculated with 3-phase correction command voltages from said voltage detection delay model.

5. An electric power steering apparatus of a vector control system that calculates steering assist command values of dq-axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle, comprising:

a first 3-phase alternative current (AC)/dq-axes converting section that converts detected 3-phase motor terminal voltages into dq-axes detection voltages in synchronous with a motor rotational angle and a motor rotational number;

a 3-phase command voltage calculating section that calculates 3-phase command voltages based on said 3-phase duty command values and said inverter applying voltage;

a second 3-phase AC/dq-axes converting section that converts said 3-phase command voltages into dq-axes command voltages;

a loss voltage calculating section that calculates dq-axes loss voltages due to a dead time of said inverter from differences between said dq-axes detection voltages and said dq-axes command voltages; and a dead time compensation output section that calculates dq-axes dead time compensation values of which maximum value is limited by multiplying said dq-axes loss voltages with a predetermined gain and sensing to said inverter applying voltage;

wherein a dead time compensation of said inverter is performed by feeding back said dq-axes dead time compensation values to said dq-axes voltage command values.

6. The electric power steering apparatus according to claim 5, wherein a voltage detection delay model to improve phase differences is disposed on a rear stage of said 3-phase AC/dq-axes converting section, and said differences are calculated with dq-axes correction command voltages from said voltage detection delay model.

7. The electric power steering apparatus according to claim 5, wherein further comprising a compensation amount improving section that generates dead time compensation amount to improve said dq-axes loss voltages based on a motor rotational angle, said q-axis steering assist command value and said inverter applying voltage, and said dq-axes loss voltages are corrected by said dead time compensation amount.

8. The electric power steering apparatus according to claim 7, wherein said compensation amount improving section comprising:

a dq-axes dead time compensation ideal model that outputs dq-axes ideal dead time compensation values due to said motor rotational angle;

a subtracting section that obtains deviations between said dq-axes loss voltages and said dq-axes ideal dead time compensation values; and a gain section that outputs said dead time compensation amount by multiplying said deviations with a gain, wherein said gain of said gain section is sensitive to said q-axis steering assist command value.

9. An electric power steering apparatus of a vector control system that calculates steering assist command values of dq-axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle, comprising:

a 3-phase alternative current (AC)/dq-axes converting section that converts detected 3-phase motor terminal voltages into dq-axes detection voltages in synchronous with a motor rotational angle;

a voltage ratio correction calculating section that calculates dq-axes command voltages from a ratio of said dq-axes voltage command values;

a loss voltage calculating section that calculates dq-axes loss voltages due to a dead time of said inverter from differences between said dq-axes detection voltages and said dq-axes command voltages; and a dead time compensation output section that calculates dq-axes dead time compensation values of which maximum value is limited by multiplying said dq-axes loss voltages with a predetermined gain and sensing to said inverter applying voltage;

wherein a dead time compensation of said inverter is performed by feeding back said dq-axes dead time compensation values to said dq-axes voltage command values.

10. The electric power steering apparatus according to claim 9, wherein a voltage detection delay model to improve phase differences is disposed on a rear stage of said voltage ratio correction calculating section, and said differences are calculated with dq-axes correction command voltages from said voltage detection delay model.

11. The electric power steering apparatus according to claim 9, wherein further comprising a compensation amount improving section that generates dead time compensation amount to improve said dq-axes loss voltages based on a motor rotational angle, said q-axis steering assist command value and said inverter applying voltage, and said dq-axes loss voltages are corrected by said dead time compensation amount.

12. The electric power steering apparatus according to claim 11, wherein said compensation amount improving section comprising:

a dq-axes dead time compensation ideal model that outputs dq-axes ideal dead time compensation values due to said motor rotational angle;

a subtracting section that obtains deviations between said dq-axes loss voltages and said dq-axes ideal dead time compensation values; and a gain section that outputs said dead time compensation amount by multiplying said deviations with a gain, wherein said gain of said gain section is sensitive to said q-axis steering assist command value.

13. An electric power steering apparatus of a vector control system that converts dq-axes current command values calculated from steering assist command value calculated based on at least a steering torque into 3-phase duty command values, driving-controls a 3-phase brushless motor by an inverter of a pulse width modulation (PWM) control, and applies an assist torque to a steering system of a vehicle, having:

a first function that estimates 3-phase detection voltages based on 3-phase motor terminal voltages, estimates 3-phase loss voltages due to a dead time of said inverter from differences between 3-phase command voltages calculated from said 3-phase duty command values and said 3-phase detection voltages, and performs a dead time compensation of said inverter by feeding back dead time compensation values obtained by compensating said 3-phase loss voltages to said dq-axes current command values; and a second function that calculates dead time compensation amount of said dead time based on a motor rotational angle, an inverter applying voltage, said 3-phase loss voltages and said steering assist current command values, and corrects said 3-phase loss voltages with said dead time compensation amount.

14. The electric power steering apparatus according to claim 13, wherein dead time reference compensation values are obtained based on said motor rotational angle, and said dead time compensation amount is obtained from deviations between compensation values multiplied a voltage gain sensitive to said inverter applying voltage with said dead time reference compensation values and said 3-phase loss voltages.

15. The electric power steering apparatus according to claim 14, wherein said dead time compensation amount is obtained by multiplying a current gain sensitive to said steering assist command values with said deviations, and wherein a characteristic of said current gain is greater as said steering assist command values are greater.

16. An electric power steering apparatus of a vector control system that converts dq-axes current command values calculated from steering assist command values calculated based on at least a steering torque into 3-phase duty command values, driving-controls a 3-phase brushless motor by an inverter of a pulse width modulation (PWM) control, and applies an assist torque to a steering system of a vehicle, comprising:

a midpoint voltage estimating section that estimates midpoint voltages based on 3-phase motor terminal voltages, a motor rotational angle, a motor rotational number and an inverter applying voltage;

a 3-phase detection voltage calculating section that calculates 3-phase detection voltages from said midpoint voltages and said 3-phase motor terminal voltages;

a 3-phase command voltage calculating section that calculates 3-phase command voltages based on said 3-phase duty command values and said inverter applying voltage;

a 3-phase loss voltage calculating section that estimates first 3-phase loss voltages due to a dead time of said inverter from differences between said 3-phase detection voltages and said 3-phase command voltages;

a compensation amount improving section that calculates dead time compensation amount based on a motor rotational angle, said first 3-phase loss voltages, said steering assist command values and said inverter applying voltage;

a calculating section that calculates second 3-phase loss voltages by correcting said first 3-phase loss voltages with said dead time compensation amount; and a dead time compensation output section that calculates dq-axes dead time compensation values from said second 3-phase loss voltages with a sensitivity to said inverter applying voltage and in synchronous with said motor rotational angle, and feeds back said dq-axes dead time compensation values to said dq-axes current command value.

17. The electric power steering apparatus according to claim 16, wherein said compensation amount improving section comprising:

a dead time compensation value functional section that calculates correction-dead time compensation values with functions due to said motor rotational angle and said inverter applying voltage;

a subtracting section that obtains deviations between said correction-dead time compensation values and said first 3-phase loss voltages; and a gain section that calculates a current gain sensitive to said steering assist command values, and outputs said dead time compensation amount by multiplying said deviations with said current gain.

18. The electric power steering apparatus according to claim 17, wherein said dead time compensation value functional section comprising:

an angle-dead time compensation value functional section that calculates 3-phase reference dead time compensation values based on said motor rotational angle;

an inverter applying voltage-sensitive gain calculating section that calculates a voltage-sensitive gain based on said inverter applying voltage; and a multiplying section that multiplies said 3-phase reference dead time compensation values with said voltage-sensitive gain, and outputs said correction-dead time compensation values, wherein a characteristic of said current gain is greater as said steering assist command values are greater.

* * * * *